United States Patent
Chae

(10) Patent No.: US 10,622,844 B2
(45) Date of Patent: Apr. 14, 2020

(54) METHOD FOR DETECTING FOREIGN OBJECT AND APPARATUS FOR SAME

(71) Applicant: LG INNOTEK CO., LTD., Seoul (KR)

(72) Inventor: Yong Suk Chae, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/434,005

(22) Filed: Jun. 6, 2019

(65) Prior Publication Data

US 2019/0296590 A1    Sep. 26, 2019

Related U.S. Application Data

(63) Continuation of application No. PCT/KR2017/012877, filed on Nov. 14, 2017.

(30) Foreign Application Priority Data

Dec. 6, 2016   (KR) .................. 10-2016-0164973
Dec. 20, 2016  (KR) .................. 10-2016-0174436

(51) Int. Cl.
*H02J 7/00* (2006.01)
*H02J 50/60* (2016.01)
(Continued)

(52) U.S. Cl.
CPC ............. *H02J 50/60* (2016.02); *H02J 7/02* (2013.01); *H02J 50/12* (2016.02); *H02J 50/90* (2016.02)

(58) Field of Classification Search
CPC ............. H02J 50/60; H02J 50/90; H02J 50/12
(Continued)

(56) References Cited

U.S. PATENT DOCUMENTS

2011/0196544 A1   8/2011  Baarman et al.
2013/0076153 A1*  3/2013  Murayama ............ H02J 50/60
                                             307/104
(Continued)

FOREIGN PATENT DOCUMENTS

KR   10-2013-0002992 A   1/2013
KR   10-2014-0008273 A   1/2014
(Continued)

*Primary Examiner* — Zixuan Zhou
(74) *Attorney, Agent, or Firm* — Birch, Stewart, Kolasch & Birch, LLP

(57) ABSTRACT

A method for detecting a foreign object in a wireless power transmitter, which wirelessly transmits power to a wireless power receiver through a resonant circuit comprised therein, according to one embodiment of the present invention may comprise the steps of: measuring the strength of power transmitted through the resonant circuit in a power transmission step; receiving, from the wireless power receiver, a feedback packet comprising information on a receive power strength; determining whether the information on the receive power strength is normal; when it is determined that a received power strength corresponding to the information on the receive power strength is abnormal, correcting the received power strength by applying a predetermined offset thereto; calculating a path loss on the basis of the measured strength of the transmitted power and the corrected received power strength; and detecting a foreign object by comparing the calculated path loss with a path loss threshold.

17 Claims, 9 Drawing Sheets

(51) Int. Cl.
*H02J 50/90* (2016.01)
*H02J 50/12* (2016.01)
*H02J 7/02* (2016.01)

(58) Field of Classification Search
USPC .......................................... 320/108; 307/104
See application file for complete search history.

(56) References Cited

U.S. PATENT DOCUMENTS

| | | | |
|---|---|---|---|
| 2013/0094598 A1* | 4/2013 | Bastami | ................. H02J 5/005 375/259 |
| 2014/0232199 A1 | 8/2014 | Jung et al. | |
| 2014/0266036 A1 | 9/2014 | Jung et al. | |
| 2016/0006263 A1 | 1/2016 | Shichino | |
| 2016/0241086 A1 | 8/2016 | Jung et al. | |

FOREIGN PATENT DOCUMENTS

| | | |
|---|---|---|
| KR | 10-2014-0104242 A | 8/2014 |
| KR | 10-2014-0113147 A | 9/2014 |
| KR | 10-2015-0059069 A | 5/2015 |
| WO | WO 2015/069780 A1 | 5/2015 |

\* cited by examiner

| HEADER | PACKET TYPE | MESSAGE SIZE (BYTE) |
|---|---|---|
| 0x01 | Signal Strength | 1 |
| 0x02 | End Power Transfer | 1 |
| 0x06 | Power Control Hold-off | 1 |
| 0x51 | Configuration | 5 |
| 0x71 | Identification | 7 |
| 0x81 | Extended Identification | 8 |
| 0x07 | General Request | 1 |
| 0x20 | Specific Request | 2 |
| 0x22 | FOD Status | 2 |
| 0x03 | Control Error | 1 |
| 0x09 | Renegotiate | 1 |
| 0x31 | 24-bit Received Power | 3 |
| 0x04 | 8-bit Received Power | 1 |
| 0x05 | Charge Status | 1 |

METHOD FOR DETECTING FOREIGN OBJECT AND APPARATUS FOR SAME

CROSS REFERENCE TO RELATED APPLICATIONS

This application is a Continuation of PCT International Application No. PCT/KR2017/012877, filed on Nov. 14, 2017, which claims priority under 35 U.S.C. 119(a) to Patent Application No. 10-2016-0164973, filed in Republic of Korea on Dec. 6, 2016 and to Patent Application No. 10-2016-0174436, filed in Republic of Korea on Dec. 20, 2016, all of which are hereby expressly incorporated by reference into the present application.

TECHNICAL FIELD

Embodiments relate to wireless power transmission technology and, more particularly, a foreign object detection method capable of detecting a foreign object present on a wireless power transmission path, and an apparatus therefor.

BACKGROUND ART

Recently, as information and communication technology has been rapidly developed, a ubiquitous society based on information and communication technology is being developed.

In order to connect information communication devices anytime anywhere, sensors equipped with a computer chip having a communication function should be installed in all social facilities. Accordingly, supplying power to such devices or sensors is a new challenge. In addition, as the types of mobile devices such as music players such as Bluetooth handsets or iPods as well as mobile phones have rapidly increased, it is necessary for users to take more time and efforts to charge batteries. As a method of solving such problems, wireless power transmission technology has recently attracted attention.

Wireless power transmission or wireless energy transmission refers to technology for wirelessly transmitting electric energy from a transmitter to a receiver using the magnetic induction principle. In 1800s, electric motors or transformers using the electromagnetic induction principle have begun to be used and, thereafter, attempts have been made to radiate electromagnetic waves such as high frequencies, microwaves and lasers to transfer electric energy. Frequently used electric toothbrushes or some wireless shavers are charged using the electromagnetic induction principle.

Up to now, a wireless energy transmission method may be roughly divided into a magnetic induction method, an electromagnetic resonance method and a radio frequency (RF) transmission method of a short-wavelength radio frequency.

The magnetic induction method uses a phenomenon that, when two coils are located adjacent to each other and then current is applied to one coil, a magnetic flux is generated to cause an electromotive force in the other coil, and is rapidly being commercialized in small devices such as mobile phones. The magnetic induction method may transfer power of up to several hundreds of kilowatts (kW) and has high efficiency. However, since a maximum transmission distance is 1 centimeter (cm) or less, a device to be charged should be located adjacent to a charger or the floor.

The electromagnetic resonance method uses an electric field or a magnetic field instead of using electromagnetic waves or current. The electromagnetic resonance method is rarely influenced by electromagnetic waves and thus is advantageously safe for other electronic devices or human bodies. In contrast, this method may be used in a limited distance and space and energy transmission efficiency is somewhat low.

The short-wavelength wireless power transmission method (briefly, referred to as the RF transmission method) takes advantage of the fact that energy may be directly transmitted and received in the form of a radio wave. This technology is a RF wireless power transmission method using a rectenna. The rectenna is a combination of an antenna and a rectifier and means an element for directly converting RF power into DC power. That is, the RF method is technology of converting AC radio waves into DC. Recently, as efficiency of the RF method has been improved, studies into commercialization of the RF method have been actively conducted Wireless power transmission technology may be used not only in mobile related industries but also in various industries such as IT, railroad and home appliance.

If a conductor which is not a wireless power receiver, that is, a foreign object (FO), is present in a wireless charging area, an electromagnetic signal received from a wireless power transmitter may be induced in the foreign object. For example, the FO may comprise coins, clips, pins, and ballpoint pens.

If an FO is present between a wireless power receiver and a wireless power transmitter, wireless charging efficiency may be significantly lowered, and the temperatures of the wireless power receiver and the wireless power transmitter may increase due to increase in ambient temperature of the FO. If the FO located in the charging area is not quickly removed, power waste may occur and an apparatus may be damaged due to overheating.

Accordingly, accurate detection of the FO on a wireless power transmission path is becoming an important issue in wireless charging technology.

In a wireless charging system according to current Qi, a method based on path loss of transmit power and a method based on change in quality factor value are used as a representative method of detecting a foreign object placed in a charging area.

However, in the case of the foreign object detection method based on path loss of transmit power, when information on an accurate receive power strength is not received from a wireless power receiver, a wireless power transmitter may fail in foreign object detection.

If information on the receive power strength is not normal, the wireless power transmitter may erroneously determine that a foreign object is placed although the foreign object is not placed on the wireless power transmission path, thereby stopping charging.

DISCLOSURE

Technical Problem

Embodiments provide a foreign object detection method capable of detecting a foreign object present on a wireless power transmission path, and an apparatus therefor.

Embodiments provide a foreign object detection method capable of adaptively correcting a threshold value (or a threshold range) for foreign object detection depending on whether a receive power strength is normal, and an apparatus therefor.

Embodiments provide a foreign object detection method capable of correcting path loss to detect a foreign object when a receiver in which a receive power strength is abnormal as compared to a transmit power strength is identified in a fixed frequency type wireless power transmitter, and an apparatus therefor.

Embodiments provide a foreign object detection method capable of preventing power transmission from being stopped even when a foreign object is not present, by adaptively correcting received power strength depending on whether information on a receive power strength fed back from a wireless power receiver is normal, and an apparatus therefor.

Embodiments provide a foreign object detection method capable of correcting a receive power strength to detect a foreign object when a receiver in which a receive power strength is abnormal as compared to a transmit power strength is identified in a fixed frequency type wireless power transmitter, and an apparatus therefor.

The technical problems solved by the embodiments are not limited to the above technical problems and other technical problems which are not described herein will become apparent to those skilled in the art from the following description.

Technical Solution

Embodiments provide a foreign object detection method and an apparatus therefor.

A foreign object detection method in a wireless power transmitter for transmitting wireless power to a wireless power receiver according to an embodiment comprises receiving information on a receive power strength from the wireless power receiver, determining whether the receive power strength is normal, correcting the receive power strength upon determining that the receive power strength is not normal, calculating path loss of transmit power based on the corrected receive power strength, and detecting a foreign object based on the calculated path loss.

Here, the information on the receive power strength may be comprised and received in a packet periodically fed back in a power transfer phase, and the fed-back packet is a signal strength packet defined in the WPC standard.

For example, the determining of whether the receive power strength is normal may comprise determining a first threshold value indicating a maximum receive power strength receivable by the wireless power receiver in correspondence with a current transmit power strength, and determining that the receive power strength is not normal when the receive power strength exceeds the first threshold value.

In another example, the determining of whether the receive power strength is normal may comprise determining a first threshold range indicating a power level receivable by the wireless power receiver based on a current transmit power strength and predefined transmission efficiency, and determining that the receive power strength is not normal when the receive power strength is out of the first threshold range.

In addition, the correcting of the receive power strength may comprise determining an offset value based on a current transmit power strength, and subtracting the offset value from the receive power strength to correct the receive power strength.

In addition, the detecting of the foreign object may comprise determining a path loss threshold value based on a current transmit power strength, and determining that a foreign object is present on a transmission path of the wireless power when the calculated path loss exceeds the path loss threshold value.

The foreign object detection method may further comprise receiving a feedback signal for power control in the phase transfer phase, and the current transmit power strength may be adjusted based on the feedback signal.

The foreign object detection method may further comprise measuring a quality factor value before entering a ping phase after detecting an object, determining a quality factor threshold value corresponding to a second wireless power receiver based on a reference quality factor value when a foreign object detection status packet comprising the reference quality factor value is received in a negotiation phase, and comparing the measured quality factor value with the determined quality factor value to detect a foreign object.

In another embodiment, a wireless power transmitter for transmitting wireless power to a wireless power receiver comprises a demodulator configured to receive a first packet for power control and a first packet comprising information on receive power strength from the wireless power receiver, a determination unit configured to determine whether the receive power strength is normal, a correction unit configured to correct the receive power strength upon determining that the receive power strength is not normal, and a detector configured to calculate path loss of transmit power based on the corrected receive power strength to detect a foreign object.

Here, the first packet and the second packet may be periodically received, and the wireless power transmitter may further comprise an adjuster configured to adjust a transmit power strength based on the first packet.

In addition, the first packet and the second packet may be a control error packet and a signal strength packet defined in the WPC standard, respectively.

For example, the determination unit may determine a first threshold value indicating a maximum receive power strength receivable by the wireless power receiver based on a current transmit power strength adjusted by the adjuster and determine that the receive power strength is not normal when the receive power strength exceeds the first threshold value.

In another example, the determination unit may determine a first threshold range indicating a power level receivable by the wireless power receiver based on a current transmit power strength adjusted by the adjuster and predefined transmission efficiency and determine that the receive power strength is not normal when the receive power strength is out of the first threshold range.

The correction unit may determine an offset value based on a current transmit power strength and subtract the offset value from the receive power strength to correct the receive power strength.

In addition, the detector may determine a path loss threshold value based on a current transmit power strength and determine that a foreign object is present on a transmission path of the wireless power when the calculated path loss exceeds the path loss threshold value.

The wireless power transmitter may further comprise a measurement unit configured to measure a quality factor value before entering a ping phase after detecting an object, and a controller configured to determine a quality factor threshold value corresponding to a second wireless power receiver based on a reference quality factor value when a foreign object detection status packet comprising the reference quality factor value is received in a negotiation phase and to compare the measured quality factor value with the determined quality factor value to detect a foreign object.

In another embodiment, a foreign object detection method in a wireless power transmitter for wirelessly transmitting power to a wireless power receiver using a resonant circuit provided therein comprises measuring a strength of power transmitted through the resonant circuit in a power transfer phase, receiving a feedback packet comprising information on a receive power strength from the wireless power receiver, determining whether the information on the receive power strength is normal, applying a predetermined offset to a receive power strength corresponding to the information on the receive power strength to correct the receive power strength, upon determining that the receive power strength is not normal, calculating path loss based on the measured strength of the transmit power and the corrected receive power strength, and comparing the calculated path loss with a path loss threshold value to detect a foreign object.

Here, the information on the receive power strength may be a signal strength packet defined in the Qi standard periodically received in a power transfer phase.

For example, the determining of whether the information on the receive power strength is normal may comprise calculating receive power strength based on the information on the receive power strength, determining a threshold value indicating a minimum receive power strength receivable by the wireless power receiver in correspondence with the measured strength of the transmit power, and determining that the information on the receive power strength is not normal when the calculated receive power strength is less than the threshold value.

In another example, the determining of whether the information on the receive power strength is normal may comprise calculating receive power strength based on the information on the receive power strength, calculating a ratio of the calculated receive power strength to the measured transmit power, and determining that the information on the receive power strength is not normal when the calculated ratio is less than a maximum path loss ratio pre-measured in correspondence with the wireless power transmitter.

In addition, the foreign object detection method further comprises setting a charging mode.

The determining of whether the information on the receive power strength is normal may comprise calculating a receive power strength based on the information on the receive power strength, determining a receive power strength threshold value corresponding to the set charging mode, and determining that the information on the receive power strength is not normal when the calculated receive power strength is less than the receive power strength threshold value.

In addition, the correcting of the receive power strength may comprise determining an offset corresponding to the set charging mode and adding the determined offset to the receive power strength to correct the receive power strength when the set charging mode is a fast charging mode.

In addition, the detecting of the foreign object may comprise determining a path loss threshold value based on the set charging mode and determining whether a foreign object is present on a transmission path of the wireless power when the calculated path loss exceeds the path loss threshold value.

In addition, the foreign object detection method may further comprise detecting a foreign object based on a quality factor value in a negotiation phase, and, when the foreign object is detected in at least one of the negotiation phase or the power transfer phase, it may be finally determined that the foreign object is detected.

In another embodiment, a foreign object detection method in a wireless power transmitter for wirelessly transmitting power to a wireless power receiver using a resonant circuit provided therein comprises entering a power transfer phase to start a foreign object detection procedure based on path loss, without performing a foreign object detection procedure based on a quality factor value in a negotiation phase, determining whether information on the receive power strength is normal upon receiving a feedback packet comprising the information on the receive power strength, and ending the started foreign object detection procedure based on the path loss and performing the foreign object detection procedure based on the quality factor value, upon determining that the information on the receive power strength is not normal.

In another embodiment, a wireless power transmitter for transmitting wireless power to a wireless power receiver comprises a resonant circuit configured to wirelessly transmit a power signal, a measurement unit configured to measure a strength of the transmitted power signal, a demodulator configured to receive a feedback packet comprising information on a receive power strength, and a controller configured to determine whether the information on the receive power strength is normal. Upon determining that the information on the receive power strength is not normal, the controller applies a predetermined offset to the receive power strength corresponding to the information on the receive power strength to correct the receive power strength and calculates path loss based on the measured strength of the power signal and the corrected receive power strength to detect a foreign object.

Here, the information on the receive power strength may be a signal strength packet defined in the Qi standard periodically received in a power transfer phase.

For example, the controller may calculate receive power strength based on the information on the receive power strength, determine a threshold value indicating a minimum receive power strength receivable by the wireless power receiver in correspondence with the measured strength of the transmit power, and determine that the information on the receive power strength is not normal when the calculated receive power strength is less than the threshold value.

In another example, the controller may calculate receive power strength based on the information on the receive power strength, calculate a ratio of the calculated receive power strength to the measured transmit power, and determine that the information on the receive power strength is not normal when the calculated ratio is less than a maximum path loss ratio pre-measured in correspondence with the wireless power transmitter.

In another example, the controller may set a charging mode, calculate a receive power strength based on the information on the receive power strength, determine a receive power strength threshold value corresponding to the set charging mode, and determine that the information on the receive power strength is not normal when the calculated receive power strength is less than the receive power strength threshold value.

In addition, the controller may determine an offset corresponding to the set charging mode and add the determined offset to the receive power strength to correct the receive power strength when the set charging mode is a fast charging mode.

In addition, the controller may determine a path loss threshold value based on the set charging mode and determine whether a foreign object is present on a transmission path of the wireless power when the calculated path loss exceeds the path loss threshold value.

In addition, the controller may further perform a procedure for detecting a foreign object based on a quality factor value in a negotiation phase, and may finally determine that the foreign object is detected when the foreign object is detected in at least one of the negotiation phase or the power transfer phase.

In another embodiment, a computer-readable recording medium having recorded thereon a program for executing any one of the above-described methods may be provided.

The aspects of the disclosure are only a part of the preferred embodiments of the disclosure, and various embodiments based on technical features of the disclosure may be devised and understood by the person with ordinary skill in the art based on the detailed description of the disclosure.

Advantageous Effects

The effects of the method and apparatus according to embodiments are as follows.

Embodiments have an advantage of providing a foreign object detection method capable of detecting a foreign object present on a wireless power transmission path, and an apparatus therefor.

Embodiments have an advantage of providing a foreign object detection method capable of adaptively correcting a threshold value (or a threshold range) for foreign object detection depending on whether a receive power strength is normal, and an apparatus therefor.

Embodiments have an advantage of providing a foreign object detection method capable of correcting path loss to detect a foreign object when a receiver in which a receive power strength is abnormal as compared to a transmit power strength is identified in a fixed frequency type wireless power transmitter, and an apparatus therefor.

Embodiments have an advantage of providing a foreign object detection method capable of preventing power transmission from being stopped even when a foreign object is present, by adaptively correcting a receive power strength depending on whether information on receive power strength fed back from a wireless power receiver is normal, and an apparatus therefor.

Embodiments have an advantage of providing a foreign object detection method capable of correcting a receive power strength to detect a foreign object when a receiver in which a receive power strength is abnormal as compared to a transmit power strength is identified in a fixed frequency type wireless power transmitter, and an apparatus therefor.

Embodiments have an advantage of minimizing foreign object detection errors and minimizing user inconvenience due to charging delay.

The effects of the disclosure are not limited to the above-described effects and other effects which are not described herein may be derived by those skilled in the art from the following description of the embodiments of the disclosure. That is, effects which are not intended by the disclosure may be derived by those skilled in the art from the embodiments of the disclosure.

DESCRIPTION OF DRAWINGS

The accompanying drawings, which are comprised to provide a further understanding of the disclosure and are incorporated in and constitute a part of this application, illustrate embodiment(s) of the disclosure and together with the description serve to explain the principle of the disclosure. In the drawings.

BEST MODE

Figure 1:
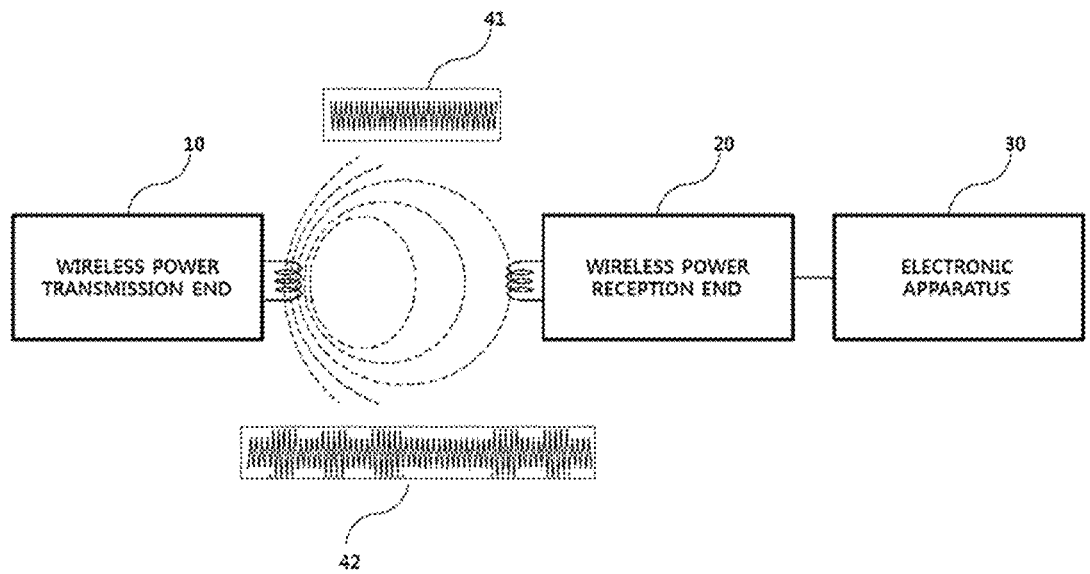
FIG. 1 is a block diagram illustrating a wireless charging system according to an embodiment.

A foreign object detection method in a wireless power transmitter for transmitting wireless power to a wireless power receiver comprises receiving information on a receive power strength from the wireless power receiver, determining whether the receive power strength is normal, correcting the receive power strength upon determining that the receive power strength is not normal, calculating path loss of transmit power based on the corrected receive power strength; and detecting a foreign object based on the calculated path loss.

[Mode For Invention]

Hereinafter, apparatuses and various methods according to embodiments will be described in detail with reference to the accompanying drawings. In general, a suffix such as "module" or "unit" may be used to refer to elements or components. Use of such a suffix herein is merely intended to facilitate description of the specification, and the suffix itself is not intended to have any special meaning or function.

A suffix used in the following description, such as "module" or "unit", may refer to a software configuration implemented through execution of a program loaded on a microprocessor but is merely an example. Some "module" and "unit" may be implemented in hardware or may be implemented in a combination of a software configuration and a hardware configuration. Accordingly, the "module" and "unit" used in the following description should not be construed only as a software component.

In the following description of the embodiments, it will be understood that, when each element is referred to as being formed "on" or "under" the other element, it can be directly "on" or "under" the other element or be indirectly formed with one or more intervening elements therebetween. In addition, it will also be understood that "on" or "under" the element may mean an upward direction and a downward direction of the element.

In description of embodiments, a signal transmitted between a wireless power transmission apparatus and a wireless power reception apparatus is used interchangeably with a packet.

In the description of embodiments, an apparatus having a function for transmitting wireless power in a wireless charging system may be used interchangeably with a wireless power transmitter, a wireless power transmission apparatus, a wireless electric power transmission apparatus, a wireless electric power transmitter, a transmission end, a transmitter, a transmission apparatus, a transmission side, a wireless power transmission apparatus, a wireless power tranferer, etc., for convenience of description. An apparatus having a function for receiving wireless power from a wireless power transmission apparatus may be used interchangeably with a wireless electric power reception apparatus, a wireless electric power receiver, a wireless power reception apparatus, a wireless power receiver, a reception terminal, a reception side, a reception apparatus, a receiver, etc.

The transmitter according to embodiment may be configured in the form of a pad, a cradle, an access point (AP), a small base station, a stand, a ceiling embedded structure or a wall-mounted structure. One transmitter may transfer power to a plurality of wireless power reception apparatuses. To this end, the transmitter may comprise at least one wireless power transmission means. Here, the wireless power transmission means may use various wireless power transmission standards based on an electromagnetic induction method of performing charging using the electromagnetic induction principle in which a magnetic field is generated in a power transmission-end coil and electricity is induced in a reception-end coil by the magnetic field. Here, the wireless power transmission means may comprise wireless charging technology of the electromagnetic induction method defined in the Wireless Power Consortium (WPC) or Qi and Power Matters Alliance (PMA) which are the wireless charging technology organizations.

In addition, a receiver according to an embodiment may comprise at least one wireless power reception means and may simultaneously receive wireless power from two or more transmitters. Here, the wireless power reception means may comprise wireless charging technology of the electromagnetic induction method defined in the Wireless Power Consortium (WPC) (or Qi) and Power Matters Alliance (PMA) which are the wireless charging technology organizations.

The receiver according to the embodiment may be used in a small electronic apparatus such as a mobile phone, a smartphone, a laptop, a digital broadcast terminal, a personal digital assistant (PDA), a portable multimedia player (PMP), a navigation system, an MP3 player, an electric toothbrush, an electronic tag, a lighting device, a remote controller, a fishing float, a wearable device such as a smart watch, etc. without being limited thereto, and may be used in any apparatus comprising wireless power reception means according to embodiment to charge a battery.

FIG. 1 is a block diagram illustrating a wireless charging system according to an embodiment.

Referring to FIG. 1, the wireless charging system roughly comprises a wireless power transmission end 10 for wirelessly transmitting power, a wireless power reception end 20 for receiving the transmitted power and an electronic apparatus 20 for receiving the received power.

For example, the wireless power transmission end 10 and the wireless power reception end 20 may perform in-band communication in which information is exchanged using the same frequency band as the operating frequency used for wireless power transmission. In another example, the wireless power transmission end 10 and the wireless power reception end 20 may perform out-of-band communication in which information is exchanged using the frequency band different from the operating frequency used for wireless power transmission.

For example, the information exchanged between the wireless power transmission end 10 and the wireless power reception end 20 may comprise status information of each other and control information. Here, the status information and the control information exchanged between the transmission end and the reception end will become more apparent through the following description of the embodiments.

In-band communication and out-of-communication may provide bidirectional communication, but the embodiments are not limited thereto. In another embodiment, in-band communication and out-of-communication may provide a unidirectional communication or half duplex communication.

For example, unidirectional communication may, but is not limited to, mean transmission of information from the wireless power reception end 20 to the wireless power transmission end 10 or transmission from the wireless power transmission end 10 to the wireless power reception end 20.

The half duplex communication method is characterized in that bidirectional communication between the wireless power reception end 20 and the wireless power transmission end 10 is enabled but information can be transmitted only by one device at a certain point in time.

The wireless power reception end 20 according to the embodiment may acquire a variety of status information of the electronic apparatus 30. For example, the status information of the electronic apparatus 30 may comprise, but is not limited to, current power usage information, current power usage information, information for identifying an executed application, CPU usage information, battery charge status information, battery output voltage/current information, etc. and may comprise information capable of being acquired from the electronic apparatus 30 and being used for wireless power control.

In particular, the wireless power transfer end 10 according to the embodiment may transmit a predetermined packet indicating whether fast charging is supported to the wireless power reception end 20. The wireless power reception end 20 may inform the electronic apparatus 30 that the wireless power transmission end 10 supports the fast charging mode, upon determining that the wireless power transmission end 10 supports the fast charging mode. The electronic apparatus 30 may display information indicating that fast charging is possible through a predetermined display means, for example, a liquid crystal display.

In addition, the user of the electronic apparatus 30 may select a predetermined fast charging request button displayed on the liquid crystal display means and control the wireless power transmission end 10 to operate in the fast charging mode. In this case, when the user selects the fast charging request button, the electronic apparatus 30 may transmit a predetermined fast charging request signal to the wireless power reception end 20. The wireless power reception end 20 may generate and transmit a charging mode packet corresponding to the received fast charging request signal to the wireless power transmission end 10, thereby switching a normal low-power charging mode (or a baseline charging mode) to the fast charging mode.

Figure 2:
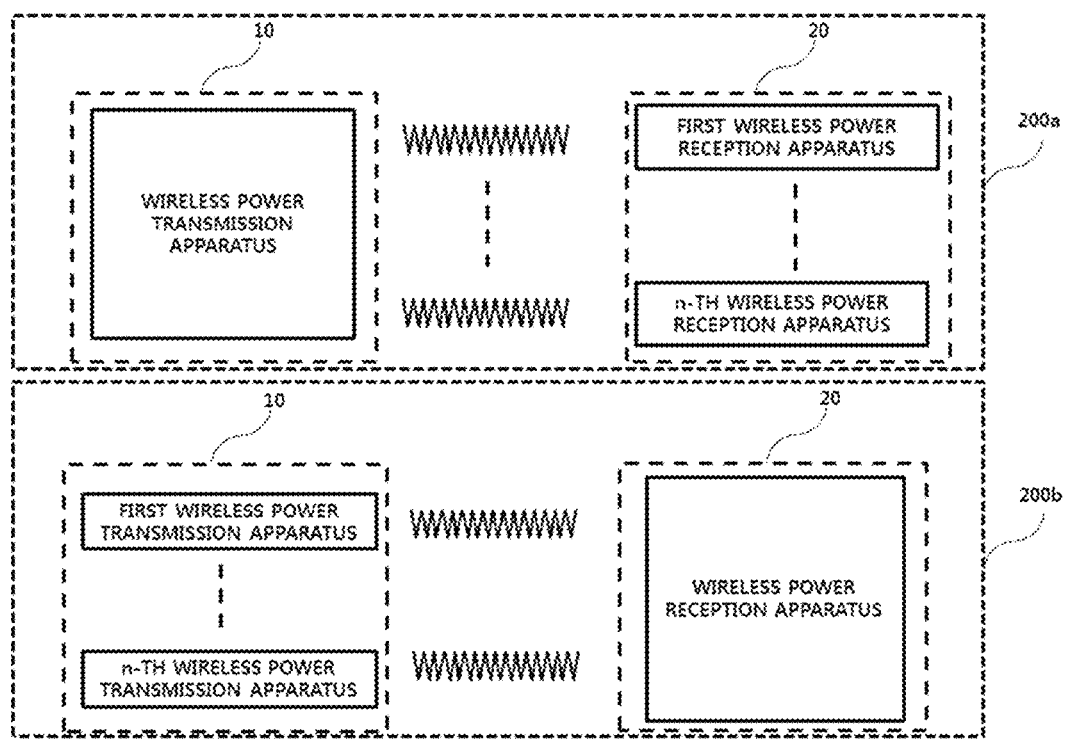
FIG. 2 is a block diagram illustrating a wireless charging system according to another embodiment.

FIG. 2 is a block diagram illustrating a wireless charging system according to another embodiment.

For example, as denoted by reference numeral 200*a*, the wireless power reception end 20 may comprise a plurality of wireless power reception apparatuses, which are connected to one wireless power transmission end 10 to perform wireless charging. At this time, the wireless power transmission end 10 may divide and transfer power to the plurality of wireless power reception apparatuses in a time-divisional manner but is not limited thereto. In another example, the wireless power transmission end 10 may divide and transfer power to the plurality of wireless power reception apparatus using different frequency bands respectively allocated to the wireless power reception apparatuses.

At this time, the number of wireless power reception apparatuses connectable to one wireless power transmission end 10 may be adaptively determined based on at least one of the required power of each wireless power reception apparatus, a battery charge state, power consumption of the electronic apparatus and available power of the wireless power transmission apparatus.

In another example, as denoted by reference numeral 200*b*, the wireless power transmission end 10 may comprise a plurality of wireless power transmission apparatuses. In this case, the wireless power reception end 20 may be simultaneously connected to the plurality of wireless power transmission apparatuses and may simultaneously receive power from the connected wireless power transmission apparatuses to perform charging. At this time, the number of wireless power transmission apparatuses connected to the wireless power reception end 20 may be adaptively determined based on the required power of the wireless power reception end 20, a battery charge state, power consumption of the electronic apparatus, and available power of the wireless power transmission apparatus.

Figure 3:
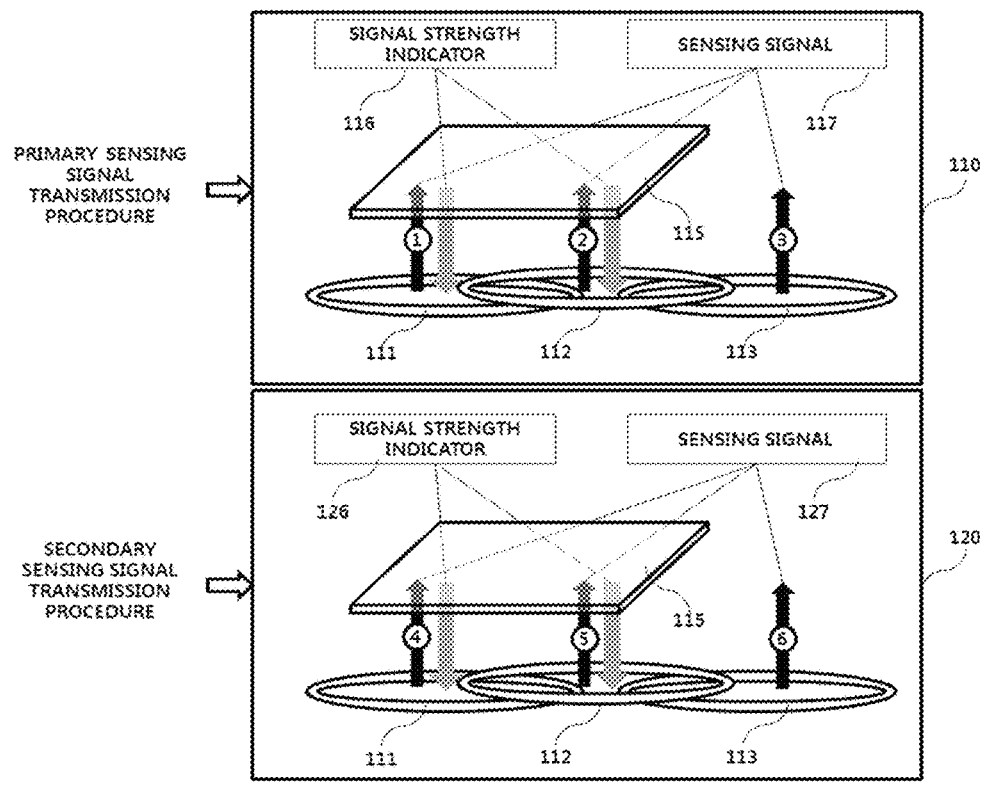
FIG. 3 is a diagram illustrating a procedure for transmitting a sensing signal in a wireless charging system according to an embodiment.

FIG. 3 is a diagram illustrating a procedure for sensing a wireless power receiver in a wireless charging system according to an embodiment.

For example, a wireless power transmitter may comprise three transmission coils 111, 112 and 113. Each transmission coil may partially overlap another transmission coil and the wireless power transmitter sequentially transmits predetermined sensing signals 117 and 127 for sensing presence of a wireless power receiver through each transmission coil, for example, digital ping signals, in a predefined order.

As shown in FIG. 3, the wireless power transmitter may sequentially transmit the sensing signal 117 through a primary sensing signal transmission procedure denoted by reference numeral 110 and identify the transmission coils 111 and 112 for receiving a signal strength signal 116 from the wireless power receiver 115. Here, the signal strength signal may comprise information on a signal strength measured in the wireless power receiver 115 in correspondence with the sensing signal (hereinafter referred to as a signal strength indicator, for convenience of description).

Subsequently, the wireless power transmitter may sequentially transmit the sensing signal 127 through a secondary sensing signal transmission procedure denoted by reference numeral 120, identify a transmission coil having good power transmission efficiency (or charging efficiency), that is, good alignment state between the transmission coil and the reception coil, between the transmission coils 111 and 112 for receiving the signal strength indicator 126, and perform control to transfer power through the identified transmission coil, that is, perform wireless charging.

As shown in FIG. 3, the wireless power transmits the two sensing signal transmission procedures in order to more accurately determine in which transmission coil the reception coil of the wireless power receiver is well aligned.

As denoted by reference numerals 110 and 120 of FIG. 3, if the signal strength indicators 116 and 126 are received in the first transmission coil 111 and the second transmission coil 112, the wireless power transmitter selects a best aligned transmission coil based on the signal strength indicator 126 received in the first transmission coil 111 and the second transmission coil 112 and performs wireless charging using the selected transmission coil.

Figure 4:
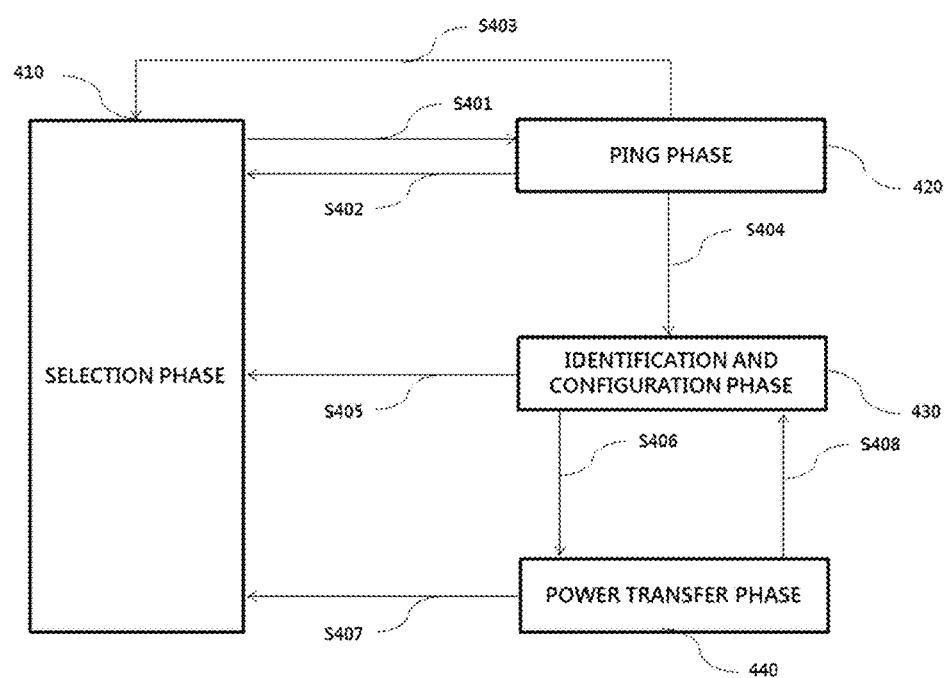
FIG. 4 is a state transition diagram explaining a wireless power transmission procedure according to an embodiment.

FIG. 4 is a state transition diagram explaining a wireless power transmission procedure according to an embodiment.

Referring to FIG. 4, the status of the wireless power transmitter for wireless power transmission may be roughly divided into a selection phase 410, a ping phase 420, an identification and configuration phase 430 and a power transfer phase 440.

The selection phase 410 may transition when power transmission starts or when a specific error or a specific event is sensed while power transmission is maintained. The specific error and the specific event will become apparent from the following description. In addition, in the selection phase 410, the transmitter may monitor whether an object is present on an interface surface. When it is sensed that the object is present on the interface surface, the transmitter may transition to the ping phase 420 (S401). In the selection phase 410, the transmitter transmits an analog ping signal having a very short pulse and sense whether an object is present in an active area of the interface surface based on change in current of the transmission coil.

In the ping phase 420, when the object is sensed, the transmitter activates the receiver and transmits a digital ping for identifying whether the receiver is compatible with the wireless charging standard. In the ping phase 420, when a response signal to the digital ping, for example, a signal strength signal, is not received from the receiver, the transmitter may transition to the selection phase 410 again (S402). In addition, in the ping phase 420, when a signal indicating that power transmission has been terminated, that is, charging termination signal, is received from the receiver, the transmitter may transition to the selection phase 410 (S403).

If the ping phase 420 is finished, the transmitter may transition to the identification and configuration phase 430 for identifying the receiver and collecting the reception configuration and status information (S404).

In the identification and configuration phase 430, when an unexpected packet is received, when an expected packet is not received during a predetermined time (timeout), when a packet transmission error occurs, or when power transmission contract is not established (no power transmission contract), the transmitter may transition to the selection phase 410 (S405).

When identification and configuration of the receiver is finished, the transmitter may transition to the power transfer phase 240 for transmitting wireless power (S406).

In the power transfer phase 440, when an unexpected packet is received, when an expected packet is not received during a predetermined time (timeout), when predetermined power transmission contract violation occurs, or when charging is terminated, the transmitter may transition to the selection phase 410 (S407).

In addition, in the power transfer phase 440, when the power transmission contract needs to be reconfigured according to transmitter state change, the transmitter may transition to the identification and configuration phase 430 (S408).

The power transmission contract may be configured based on the transmitter and receiver status information and characteristic information. For example, the transmitter status information may comprise information on the maximum amount of transmittable power, information on the maximum number of receivable receivers, etc. and the receiver status information may comprise information on required power.

Figure 5:
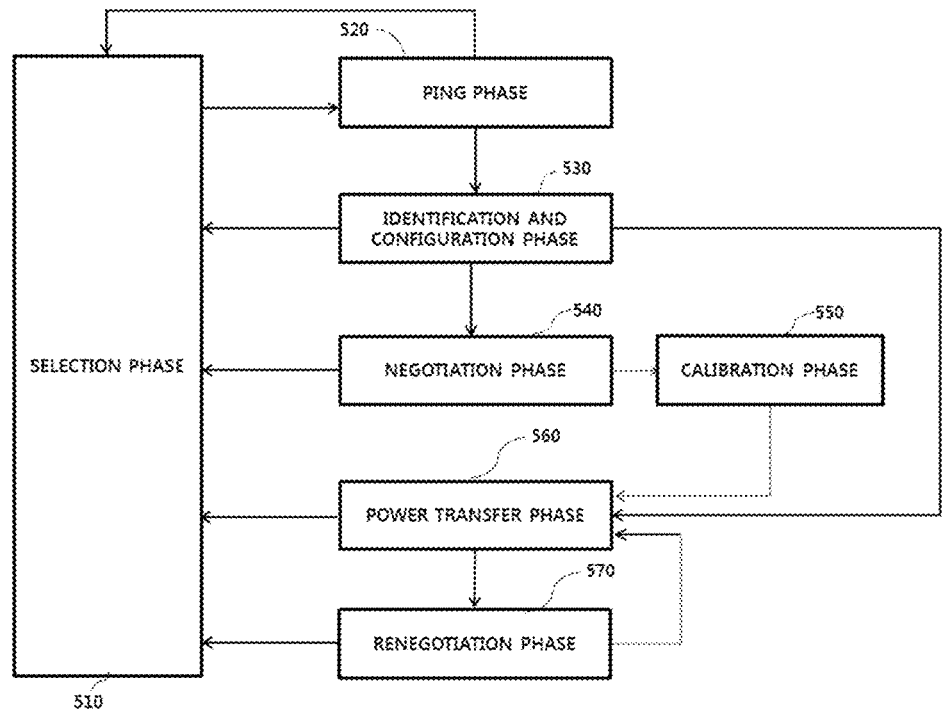
FIG. 5 is a state transition diagram explaining a wireless power transmission procedure according to another embodiment.

FIG. 5 is a state transition diagram explaining a wireless power transmission procedure.

Referring to FIG. 5, power transmission from the transmitter to the receiver according to an embodiment may be roughly divided into a selection phase 510, a ping phase, 520, an identification and configuration phase 530, a negotiation phase 540, a calibration phase 550, a power transfer phase 560 and a renegotiation phase 570.

The selection phase 510 may transition when a specific error or a specific event is sensed while power transmission starts or power transmission is maintained, that is, may comprise reference numerals S502, S504, S508, S510 and S512, for example. The specific error and the specific event will become apparent from the following description. In addition, in the selection phase 510, the transmitter may monitor whether an object is present on an interface surface. When it is sensed that the object is present on the interface surface, the transmitter may transition to the ping phase 520. In the selection phase 510, the transmitter transmits an analog ping signal having a very short pulse and senses whether an object is present in an active area of the interface surface based on change in current of a transmission coil or a primary coil.

If an object is detected in the selection phase 510, the wireless power transmitter may measure the quality factor of a wireless power resonant circuit, for example, a transmission coil and/or a resonant capacitor for wireless power transmission.

The wireless power transmitter may measure inductance of a wireless power resonant circuit (e.g., a power transmission coil and/or a resonant capacitor).

A detailed measurement method will be described using other drawings.

The quality factor and/or inductance may be used to determine whether a foreign object is present in the negotiation phase 540 in the future.

When the object is detected in the ping phase 520, the transmitter wakes up the receiver and transmits a digital ping for identifying whether the detected object is a wireless power receiver (S501). In the ping phase 520, when a response signal to the digital ping, for example, a signal strength packet, is not received from the receiver, the transmitter may transition to the selection phase 510 again. In addition, in the ping phase 520, when a signal indicating that power transmission has been terminated, that is, a charging termination packet, is received from the receiver, the transmitter may transition to the selection phase 510 (S502).

If the ping phase 520 is finished, the transmitter may transition to the identification and configuration phase 530 for identifying the receiver and collecting the configuration and status information of the receiver (S503).

In the identification and configuration phase 530, when an unexpected packet is received, when an expected packet is not received during a predetermined time (timeout), when a packet transmission error occurs, or when power transmission contract is not established (no power transmission contract), the transmitter may transition to the selection phase 510 (S504).

The transmitter may determine whether entry into the negotiation phase 540 is necessary based on the negotiation field value of the configuration packet received in the identification and configuration phase 530.

Upon determining that negotiation is necessary, the transmitter may enter the negotiation phase (S505). In the negotiation phase 540, the transmitter may perform a predetermined FOD procedure.

In contrast, upon determining that negotiation is not necessary, the transmitter may immediately transition to the power transfer phase 560 (S506).

In the negotiation phase 540, the transmitter may receive a foreign object detection (FOD) status packet comprising a reference quality factor value. Alternatively, an FOD status packet comprising a reference inductance value may be received. Alternatively, a status packet comprising a reference quality factor value and a reference inductance value may be received. At this time, the transmitter may determine a quality factor threshold value for FO detection based on the reference quality factor value.

The transmitter may detect whether an FO is present in the charging area using the determined quality factor threshold value for FO detection and the currently measured quality factor value, e.g., a quality factor value measured before the ping phase, and control power transmission according to the result of FO detection. For example, when the FO is detected, power transmission may be stopped, without being limited thereto.

The transmitter may detect whether an FO is present in the charging area using the determined inductance threshold value for FO detection and the currently measured quality factor value, e.g., an inductance value measured before the ping phase, and control power transmission according to the result of FO detection. For example, when the FO is detected, power transmission may be stopped, without being limited thereto.

When the FO is detected, the transmitter may return to the selection phase 510 (S508). In contrast, when the FO is not detected, the transmitter may transition to the power transfer phase 560 through the calibration phase 550 (S507 and S509). Specifically, when the FO is not detected, the transmitter may measure power loss in the reception end and the transmission end, in order to determine the strength of the power received by the reception end and to determine the strength of the power transmitted by the transmission end in the calibration phase 550. That is, the transmitter may predict power loss based on a difference between the transmission power of the transmission end and the reception power of the reception end in the calibration phase 550. The transmitter according to one embodiment may calibrate the threshold value for FOD using the predicted power loss.

In the power transfer phase 560, when an unexpected packet is received, when an expected packet is not received during a predetermined time (timeout), when power transmission contract violation occurs or when charging is finished, the transmitter may transition to the selection phase 510 (S510).

In addition, in the power transfer phase 560, if power transmission contract needs to be reconfigured according to transmitter status change, etc., the transmitter may transition to the renegotiation phase 570 (S511). At this time, when renegotiation is normally finished, the transmitter may return to the power transfer phase 560 (S513).

The power transmission contract may be configured based on the transmitter and receiver status information and characteristic information. For example, the transmitter status information may comprise information on the maximum amount of transmittable power, information on the maximum number of receivable receivers, etc. and the receiver status information may comprise information on required power.

When renegotiation is not normally completed, the transmitter may stop power transmission to the receiver and transition to the selection phase 510 (S512).

Figure 6:
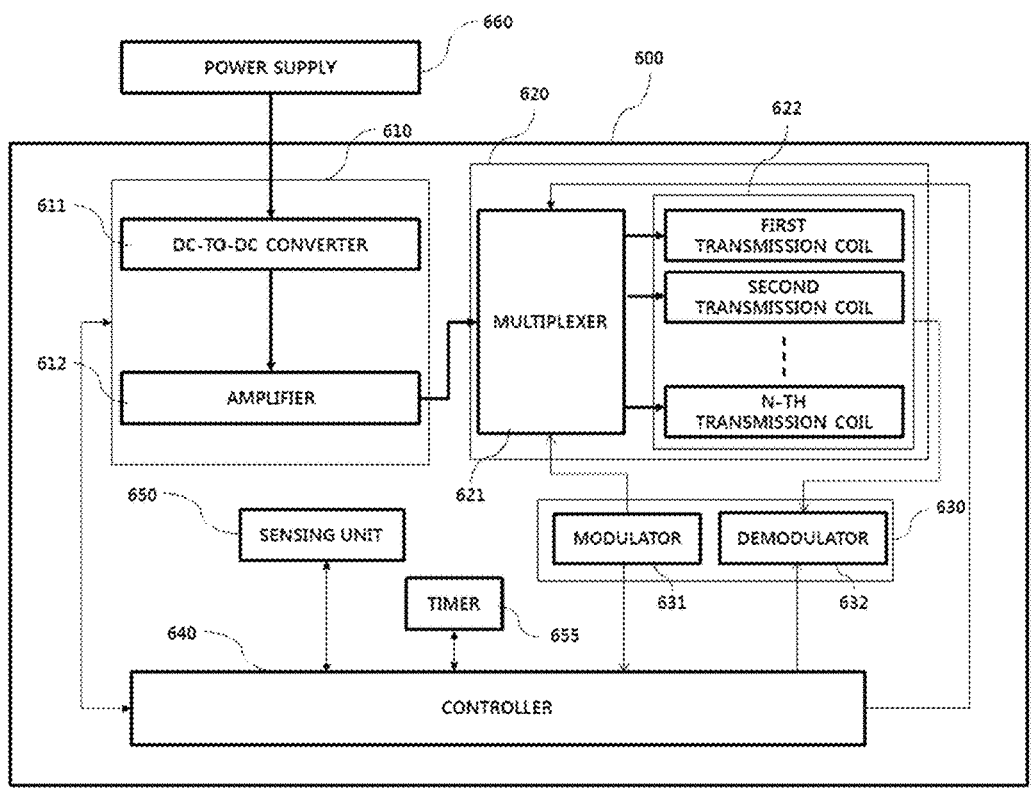
FIG. 6 is a block diagram illustrating the structure of a wireless power transmitter according to an embodiment.

FIG. 6 is a block diagram illustrating the structure of a wireless power transmitter according to an embodiment.

Referring to FIG. 6, the wireless power transmitter 600 may roughly comprise a power converter 610, a power transmission unit 620, a communication unit 630, a controller 640, and a sensing unit 650. The configuration of the wireless power transmitter 600 is not necessarily essential and thus more or fewer components may be comprised.

As shown in FIG. 6, the power converter 610 may receive and convert DC power from a power supply 660 into AC power having a predetermined strength.

To this end, the power converter 610 may comprise a DC-to-DC converter 611, an inverter 612 and a frequency generator 613. Here, the inverter 612 may be a half-bridge inverter or a full-bridge inverter, without being limited thereto. Any a circuit configuration capable of converting DC power into AC power having a specific operating frequency may be used.

The DC-to-DC converter 611 may perform a function for converting DC power received from the power supply 650 into DC power having a specific strength according to a control signal of the controller 640.

At this time, the sensing unit 650 may measure and supply the voltage/current of the converted DC power to the controller 640.

In addition, the sensing unit 650 may measure the internal temperature of the wireless power transmitter 600 and supply the measured result to the controller 640, in order to determine whether overheating occurs.

For example, the controller 640 may adaptively cut off power supplied from the power supply 650 or prevent power from being supplied to the inverter 612 based on the voltage/current value measured by the sensing unit 650. A predetermined power cutoff circuit for cutting off power supplied from the power supply 650 or power supplied to the inverter 612 may be further provided at one side of the power converter 610.

The inverter 612 may convert the DC-to-DC converted power into AC power based on a reference AC signal generated by the frequency generator 613. At this time, the frequency, that is, operating frequency, of the reference AC signal may be dynamically changed according to the control signal of the controller 640. The wireless power transmitter 600 according to an embodiment may adjust the operating frequency to adjust the strength of transmitted power. For example, the controller 640 may receive power reception status information and/or a power control signal of the wireless power receiver through the communication unit 630, determine the operating frequency based on the received power reception status information and/or power control signal, and dynamically control the frequency generator 613 to generate the determined operating frequency. For example, the power reception status information may comprise, but is not limited to, the strength information of a rectifier output voltage, the strength information of current applied to a reception coil, etc. The power control signal may comprise a signal for requesting power increase, a signal for requesting power decrease, etc.

The power transmission unit 620 may comprise a multiplexer 621 and a transmission coil unit 622. Here, the transmission coil unit 622 may comprise first to n-th transmission coils. In addition, the power transmission unit 620 may further comprise a carrier generator (not shown) for generating a specific carrier frequency for power transmission. In this case, the carrier generator may generate an AC signal having a specific carrier frequency for mixing with the output AC power of the inverter 612 received through the multiplexer 621. In one embodiment, it should be noted that the frequencies of the AC powers sent to the transmission coils may be different from each other. In another embodiment, the resonant frequencies of the transmission coils may be differently set using a predetermined frequency controller having a function for differently adjusting LC resonance characteristics of the transmission coils.

The multiplexer 621 may perform a switching function for transmitting AC power to a transmission coil selected by the controller 640. The controller 640 may select a transmission coil to be used to transmit power to the wireless power receiver based on the signal strength indicator of each transmission coil.

The controller 640 according to one embodiment may transmit power through time division multiplexing of the transmission coils if a plurality of wireless power receivers is connected. For example, if the wireless power transmitter 600 identifies three wireless power receivers, that is, first to third receivers, through three different transmission coils, that is, first to third transmission coils, the controller 640 may control the multiplexer 621 to transmit AC power only through a specific transmission coil in a specific time slot. At this time, although the amount of power transmitted to the wireless power receiver may be controlled according to the length of the time slot allocated to each transmission coil, this is merely an embodiment. In another example, the strength of the output DC power of the DC-to-DC converter 611 may be controlled during a time slot allocated to each transmission coil to control transmit power of each wireless power receiver.

The controller 640 may control the multiplexer 621 such that a sensing signal is sequentially transmitted through the first to n-th transmission coils 622 during a primary sensing signal transmission procedure. At this time, the controller 640 may identify a time when the sensing signal will be transmitted using a timer 655 and control the multiplexer 621 to transmit the sensing signal through the corresponding transmission coil when the sensing signal transmission time arrives. For example, the timer 650 may transmit a specific event signal to the controller 640 at predetermined periods during the ping transmission phase, and the controller 640 may control the multiplexer 621 to transmit the digital ping through the corresponding transmission coil, whenever the corresponding event signal is sensed.

In addition, the controller 640 may receive a predetermined transmission coil identifier for identifying through which transmission coil a response signal, e.g., a signal strength signal, has been received during the primary sensing signal transmission procedure from the demodulator 632. At this time, the controller 640 may receive a signal strength indicator corresponding to the transmission coil identifier from the demodulator 632. Subsequently, in a secondary sensing signal transmission procedure, the controller 640 may control the multiplexer 621 to transmit the sensing signal only through the transmission coil(s) through which the signal strength indicator is received during the primary sensing signal transmission procedure. In another example, if the signal strength indicator is received through the plurality of transmission coils during the primary sensing signal transmission procedure, the controller 640 may determine a transmission coil, through which a signal strength indicator having a largest value is received, as a transmission coil, through which the sensing signal will be first transmitted in the secondary sensing signal transmission procedure, and control the multiplexer 621 according to the result of determination.

The communication unit 630 may comprise at least one of a modulator 631 or the demodulator 632.

The modulator 631 may modulate the control signal generated by the controller 640 and transmit the modulated signal to the multiplexer 621. Here, the modulation method of modulating the control signal may comprise, but is not limited to, a frequency shift keying (FSK) modulation method, a Manchester coding modulation method, a phase shift keying (PSK) modulation method, a pulse width modulation method, a differential biphase modulation method, etc.

When the signal received through the transmission coil is sensed, the demodulator 632 may demodulate and transmit the sensing signal to the controller 640. Here, the demodulated signal may comprise, but is not limited to, a signal strength indicator, an error correction (EC) indicator for power control during wireless power transmission, an end of charge (EOC) indicator, an overvoltage/overcurrent indicator, etc. and may further comprise a variety of status information for identifying the status of the wireless power receiver.

In addition, the demodulator 632 may identify through which transmission coil the demodulated signal is received, and provide a predetermined transmission coil identifier corresponding to the identified transmission coil to the controller 640.

In addition, the demodulator 632 may demodulate the signal received through the transmission coil 623 and transmit the demodulated signal to the controller 640. For example, the demodulated signal may comprise, but is not limited to, a signal strength indicator and the demodulated signal may comprise a variety of status information of the wireless power receiver.

For example, the wireless power transmitter 600 may acquire the signal strength indicator through in-band communication for performing communication with the wireless power receiver using the same frequency as used for wireless power transmission.

In addition, the wireless power transmitter 600 may not only transmit wireless power through the transmission coil unit 622 but also exchange a variety of control signals and status information with the wireless power receiver through the transmission coil unit 622. In another example, separate coils respectively corresponding to the first to n-th transmission coils of the transmission coil unit 622 may be further comprised in the wireless power transmitter 600 and perform in-band communication with the wireless power receiver using the separate coils.

Although the wireless power transmitter 600 and the wireless power receiver perform in-band communication in the description of FIG. 6, this is merely exemplary and short-range bidirectional communication may be performed through a frequency band different from a frequency band used to transmit the wireless power signal. For example, short-range bidirectional low-energy communication may be any one of Bluetooth communication, RFID communication, UWB communication and ZigBee communication.

In addition, although the power transmission unit 620 of the wireless power transmitter 600 comprises the multiplexer 621 and the plurality of transmission coils 622 in the description of FIG. 6, this is merely an embodiment. In another embodiment, the power transmission unit 620 may comprise one transmission coil.

Figure 7:
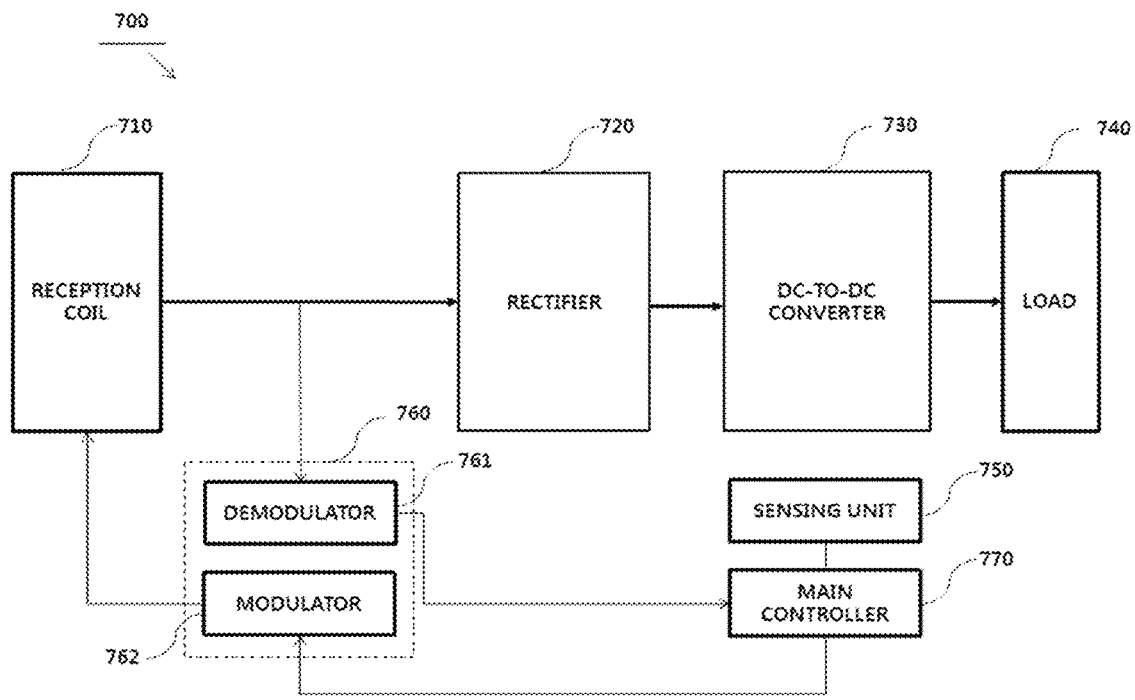
FIG. 7 is a block diagram illustrating the structure of a wireless power receiver interworking with the wireless power transmitter shown in FIG. 6.

FIG. 7 is a block diagram illustrating the structure of a wireless power receiver interworking with the wireless power transmitter shown in FIG. 6.

Referring to FIG. 7, the wireless power receiver 700 may comprise a reception coil 710, a rectifier 720, a DC-to-DC converter 730, a load 740, a sensing unit 750, a communication unit 760, and a main controller 770. The communication unit 760 may comprise a demodulator 761 and a modulator 762.

Although the wireless power receiver 700 shown in the example of FIG. 7 is shown as exchanging information with the wireless power transmitter 600 through in-band communication, this is merely exemplary and the communication unit 760 according to another embodiment may provide short-range bidirectional communication through a frequency band different from a frequency band used to transmit a wireless power signal.

AC power received through the reception coil 710 may be transmitted to the rectifier 720. The rectifier 720 may convert the AC power into DC power and transmit the DC power to the DC-to-DC converter 730. The DC-to-DC converter 730 may convert the strength of the DC power output from the rectifier into a specific strength required by the load 740 and transmit the converted power to the load 740.

The sensing unit 750 may measure the strength of the DC power output from the rectifier 720 and provide the strength to the main controller 770. In addition, the sensing unit 750 may measure the strength of current applied to the reception coil 710 according to wireless power reception and transmit the measured result to the main controller 770. In addition, the sensing unit 750 may measure the internal temperature of the wireless power receiver 700 and provide the measured temperature value to the main controller 770.

For example, the main controller 770 may compare the strength of the DC power output from the rectifier with a predetermined reference value and determine whether overvoltage occurs. Upon determining that overvoltage occurs, a predetermined packet indicating that overvoltage has occurred may be generated and transmitted to the modulator 762. The signal modulated by the modulator 762 may be transmitted to the wireless power transmitter 600 through the reception coil 710 or a separate coil (not shown). If the strength of the DC power output from the rectifier is equal to or greater than the predetermined reference value, the main controller 770 may determine that a sensing signal is received and perform control to transmit a signal strength indicator corresponding to the sensing signal to the wireless power transmitter 600 through the modulator 762 upon receiving the sensing signal. In another example, the demodulator 761 may demodulate the AC power signal between the reception coil 710 and the rectifier 720 or the DC power signal output from the rectifier 720, identify whether a sensing signal is received, and provide the identified result to the main controller 770. At this time, the main controller 770 may perform control to transmit the signal strength indicator corresponding to the sensing signal through the modulator 761.

In particular, the main controller 770 according to the embodiment may determine whether the connected wireless power transmitter performs fast charging based on the information demodulated by the demodulator 760.

In addition, when a predetermined fast charging request signal for requesting fast charging is received from the electronic apparatus 30 of FIG. 1, the main controller 770 may generate and transmit a charging mode packet corresponding to the received fast charging request signal to the modulator 761. The fast charging request signal from the electronic apparatus may be received according to user menu selection on a predetermined user interface.

The main controller 770 according to another embodiment may perform control to automatically request fast charging from the wireless power transmitter or enable the wireless power transmitter to stop fast charging and to switch to the normal low-power charging mode based on a battery remaining amount, upon determining that the connected wireless power transmitter supports the fast charging mode.

The main controller 770 according to another embodiment may monitor power consumption of the electronic apparatus in real time while charging is performed in the normal low-power charging mode. If the power consumption of the electronic apparatus is equal to or greater than a predetermined reference value, the main controller 770 may generate and transmit a predetermined charging mode packet for requesting switching to the fast charging mode to the modulator 761.

The main controller 770 according to another embodiment may compare an internal temperature value measured by the sensing unit 750 with a predetermined reference value and determine whether overheating occurs. If overheating occurs during fast charging, the main controller 770 may generate and transmit a charging mode packet such that the wireless power transmitter is switched to the normal low-power charging mode.

The main controller 770 according to another embodiment may determine whether the charging mode needs to be changed based on at least one of a battery charging rate, the strength of the voltage output from the rectifier, a usage rate of a CPU mounted in the electronic apparatus and user menu selection and generate and transmit a charging mode packet comprising the value of the charging mode to be changed to the wireless power transmitter if the charging mode needs to be changed.

Figure 8:
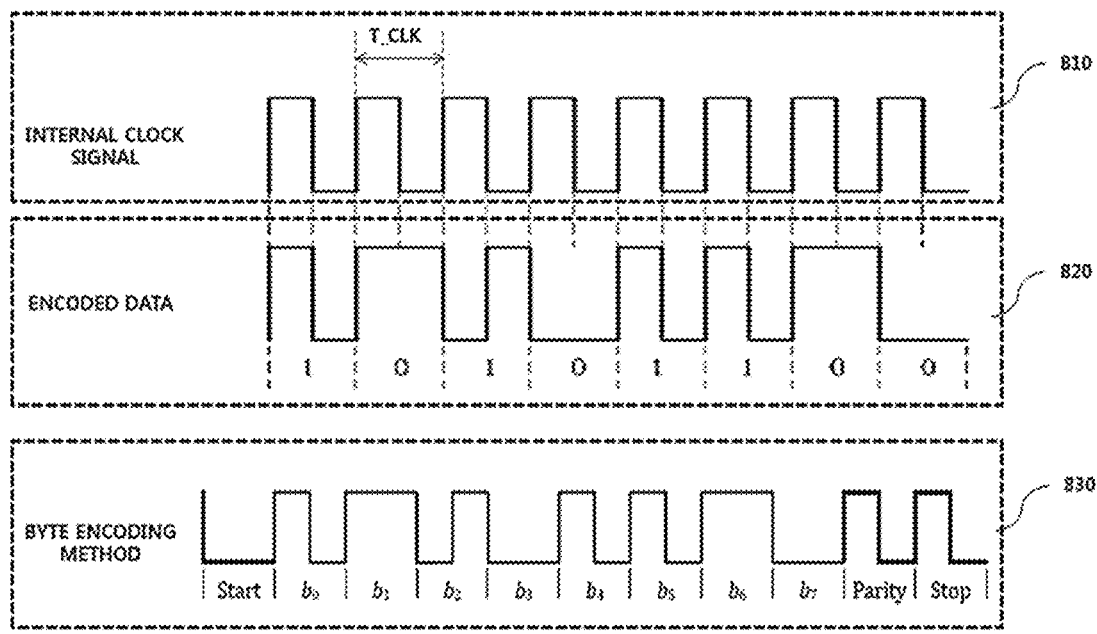
FIG. 8 is a view illustrating a method of modulating and demodulating a wireless power signal according to an embodiment.

FIG. 8 is a view illustrating a method of modulating and demodulating a wireless power signal according to an embodiment.

As denoted by reference numeral 810 of FIG. 8, the wireless power transmission end 10 and the wireless power reception end 20 may encode or decode a packet to be transmitted based on an internal clock signal having the same period.

Hereinafter, the method of encoding the packet to be transmitted will be described in detail with reference to FIGS. 1 to 8.

Referring to FIG. 1, if the wireless power transmission end 10 or the wireless power reception end 20 does not transmit a specific packet, the wireless power signal may be an unmodulated AC signal having a specific frequency as denoted by reference numeral 41 of FIG. 1. In contrast, if the wireless power transmission end 10 or the wireless power reception end 20 transmits a specific packet, the wireless power signal may be an AC signal modulated using a specific modulation method as denoted by reference numeral 42 of FIG. 1. For example, the modulation method may comprise, but is not limited to, an amplitude modulation method, a frequency modulation method, a frequency and amplitude modulation method, a phase modulation method, etc.

Differential biphase encoding is applicable to binary data of the packet generated by the wireless power transmission end 10 or the wireless power reception end 20 as denoted by reference numeral 820. Specifically, differential biphase encoding has two state transitions to encode data bit 1 and one state transition to encode data bit 0. That is, data bit 1 is encoded such that transition between a HI state and a LO state occurs in a rising edge and a falling edge of the clock signal and data bit 0 is encoded such that transition between a HI state and a LO state occurs in a rising edge of the clock signal.

A byte encoding method denoted by reference numeral 830 is applicable to the encoded binary data. Referring to reference numeral 830, the byte encoding method according to the embodiment may be a method of inserting a start bit and a stop bit for identifying start and stop of the bit stream with respect to the 8-bit encoded binary bit stream and a parity bit for sensing whether an error of the bit stream (byte) occurs.

Figures 9, 10:
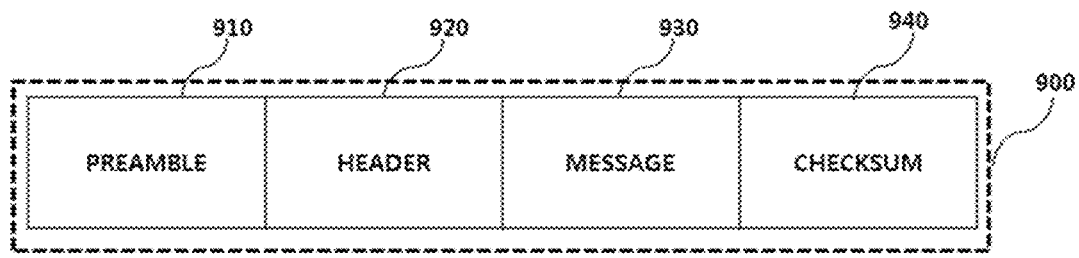
FIG. 9 is a view illustrating a packet format according to an embodiment.
FIG. 10 is a view illustrating the types of packets according to an embodiment.

FIG. 9 is a view illustrating a packet format according to an embodiment.

Referring to FIG. 9, the packet format 900 used for information exchange between the wireless power transmission end 10 and the wireless power reception end 20 may comprise a preamble 910 field for acquiring synchronization for demodulation of the corresponding packet and identifying an accurate start bit of the corresponding packet, a header 920 field for identifying the type of a message comprised in the corresponding packet, a message 930 field for transmitting the content (or payload) of the corresponding packet, and a checksum 940 field for identifying whether an error has occurred in the corresponding packet.

As shown in FIG. 9, a packet reception end may identify the size of the message 930 comprised in the corresponding packet based on the value of the header 920.

In addition, the header 920 may be defined for each step of the wireless power transmission procedure, and the value of the header 920 may be defined as the same value in different phases. For example, referring to FIG. 9, it should be noted that the header value corresponding to end power transmission of the ping phase and end power transmission of the power transfer phase is 0x02.

The message 930 comprises data to be transmitted by the transmission end of the corresponding packet. For example, the data comprised in the message 930 field may be a report, a request, or a response, without being limited thereto.

The packet 900 according to another embodiment may further comprise at least one of transmission end identification information for identifying the transmission end for transmitting the corresponding packet and reception end identification information for identifying the reception end for receiving the corresponding packet. The transmission end identification information and the reception end identification may comprise IP address information, MAC address information, product identification information, etc. However, the present disclosure is not limited thereto and information for distinguishing the reception end and the transmission end in the wireless charging system may be comprisedcomprised.

The packet 900 according to another embodiment may further comprise predetermined group identification information for identifying a reception group if the corresponding packet is received by a plurality of apparatuses.

FIG. 10 is a view illustrating the types of packets transmitted from the wireless power receiver to the wireless power transmitter according to an embodiment.

Referring to FIG. 10, the packet transmitted from the wireless power receiver to the wireless power transmitter may comprise a signal strength packet for transmitting the strength information of a sensed ping signal, a power transmission termination (end power transfer) for requesting the transmitter to stop power transmission end from the transmitter, a power control hold-off packet for transmitting time information waiting until actual power is controlled after a control error packet for control is received, a configuration packet for transmitting configuration information of the receiver, an identification packet and an extended identification packet for transmitting receiver identification information, a general request packet for transmitting a general request message, a specific request packet for transmitting a specific request message, an FOD status packet for transmitting a reference quality factor value for FO detection, a control error packet for controlling power transmitted by the transmitter, a renegotiation packet for starting renegotiation, a 24-bit received power packet for transmitting the strength information of the received power, and a charge status packet for transmitting the current charging status information of the load.

The packets transmitted from the wireless power receiver to the wireless power transmitter may be transmitted using in-band communication using the same frequency band as the frequency band used to transmit wireless power.

Figure 11:
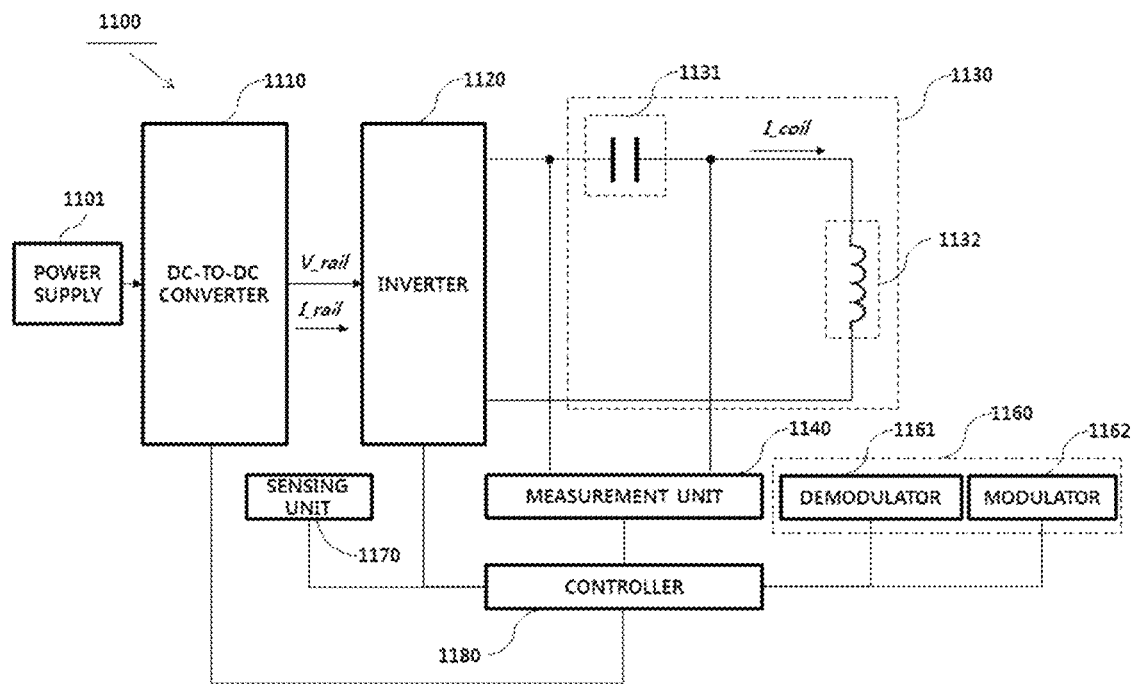
FIG. 11 is a view illustrating the structure of a foreign object detection apparatus according to an embodiment.

FIG. 11 is a view illustrating the structure of a foreign object detection apparatus according to an embodiment.

The foreign object detection apparatus 1100 according to the present embodiment may be implemented in the wireless power transmission apparatus, but this is merely one embodiment. The foreign object detection apparatus may be implemented in a measurement apparatus for authenticating the wireless power reception apparatus.

Referring to FIG. 11, a foreign object detection apparatus 100 may comprise a power supply 1101, a DC-to-DC converter 1110, an inverter 1120, a resonant capacitor 1130, a measurement unit 1140, a communication unit 1160, a sensing unit 1170 and a controller 1180. The foreign object detection apparatus 1100 according to the present embodiment may be comprised in the wireless power transmission apparatus.

The resonant circuit 1130 comprises a resonant capacitor 1131 and a transmission coil (or an inductor) 1132, and the communication unit 1160 may comprise at least one of a demodulator 1161 and a modulator 1162.

The power supply 1101 may receive DC power through an external power terminal and transmit the DC power to the DC-to-DC converter 1110.

The DC-to-DC converter 1110 may convert the strength of the DC power input from the power supply 1101 into a specific strength of DC power under control of the controller 1180. For example, the DC-to-DC converter 1110 may comprise a variable voltage generator capable of adjusting the strength of the voltage, without being limited thereto.

The inverter 1120 may convert the converted DC power into AC power. The inverter 1120 may convert the DC power input through control of a plurality of switches into an AC power signal and output the AC power signal.

For example, the inverter 1120 may be at least one of half-bridge inverter or a full-bridge inverter If the inverter 1120 comprises both a half-bridge circuit and a full-bridge circuit, the controller 1180 may dynamically determine whether the inverter 1120 operates as a half-bridge circuit or a full-bridge circuit. The wireless power transmission apparatus according to one embodiment may adaptively control the bridge mode of the inverter 1120 according to the strength of the power required by the wireless power reception apparatus or the power class of the wireless power reception apparatus. Here, the bridge mode comprises a half-bridge mode for generating an AC power signal using a half-bridge circuit and a full-bridge mode for generating an AC signal using a full-bridge circuit.

For example, if the wireless power reception apparatus requests low power of 5 W or less or if the power class of the wireless power reception apparatus corresponds to a predetermined low power (LP) class, the controller 1180 may control the inverter 1120 to operate in the half-bridge mode. In contrast, if the wireless power reception apparatus requests high power of 15 W or if the power class corresponds to a mid power (MP) class, the controller 1180 may control the inverter 1120 to operate in the full-bridge mode.

In another example, the wireless power transmission apparatus may adaptively determine the bridge mode according to the charging mode. Here, the charging mode may comprise a baseline charging mode and a fast charging mode. In the baseline charging mode, the inverter 1120 may operate in the half-bridge mode. In the fast charging mode, the inverter 1120 may operate in the full-bridge mode. The output power of the transmitter in the fast charging mode is set to be higher than the output power of the transmitter in the baseline charging mode.

In another example, the wireless power transmission apparatus may adaptively determine the bridge mode according to the temperature sensed by the sensing unit 1170 and control the inverter 1120 according to the determined bridge mode. For example, if the temperature of the wireless power transmission apparatus exceeds a predetermined reference value while wireless power is transmitted through the half-bridge mode, the controller 1180 may perform control to deactivate the half-bridge mode and activate the full-bridge mode. That is, the wireless power transmission apparatus may increase the voltage through the full-bridge circuit for transmission of power having the same strength and decrease the strength of current flowing in the resonant circuit 1130, thereby maintaining the internal temperature of the wireless power transmission apparatus at a predetermined reference value or less. In general, the amount of heat generated in an electronic part mounted in the electronic apparatus may be more sensitive to the strength of current than the strength of the voltage applied to the electronic part.

In addition, the inverter 1120 may not only convert the DC power into AC power but also dynamically change the strength of the AC power transmitted to the resonant circuit 1130.

For example, the inverter 1120 may adjust the strength of the output AC power by adjusting the frequency of a reference alternating current signal used to generate the AC power under control of the controller 1180. To this end, the inverter 1120 may comprise a frequency oscillator for generating the reference alternating current signal having a specific frequency. However, this is merely exemplary and the frequency oscillator may be mounted at one side of the foreign object detection apparatus 1100 independently of the inverter 1120.

In another example, a fixed frequency is applicable to the wireless power transmission apparatus. In this case, the foreign object detection apparatus 1100 may further comprise a gate driver (not shown) for controlling the switch provided in the inverter 1120. In this case, the gate driver may receive at least one pulse width modulation signal from the controller 1180 and control the switch of the inverter 1120, for example, the MOFET switch configuring a selected bridge circuit without being limited thereto, according to the received pulse width modulation signal. The controller 1180 may control the duty cycle, that is, the duty rate, and phase of the pulse width modulation signal to control the strength of the output power of the inverter 1120. The controller 1180 may adaptively control the duty cycle and phase of the pulse width modulation signal based on the feedback signal received from the wireless power reception apparatus, thereby controlling the strength of the power transmitted through the resonant circuit 1130.

The measurement unit 1140 may measure at least one of the level of a voltage across the resonant capacitor 1131 or the level of current flowing in the transmission coil 1132, according to the control signal of the controller 1180. To this end, the measurement unit 1140 may comprise a voltage sensor and a current sensor. The controller 1180 may calculate the strength of power transmitted through the resonant circuit 1130 based on the sensing information received from the measurement unit 1140. In addition, the measurement unit 1140 may comprise a temperature sensor to measure and transmit a temperature corresponding to a specific position of the apparatus and/or the inside of the apparatus to the controller 1180.

When the object placed in the charging area is detected in the selection phase 410 or 510, the measurement unit 1140 may measure a voltage across the resonant capacitor 1131 in a state of stopping power transmission and calculate the quality factor value corresponding to the resonant circuit 1130, before entering the ping phase 420 or 520.

In addition, the measurement unit 1140 may further calculate an inductance value corresponding to the resonant circuit 1130.

At least one of the calculated quality factor or the inductance value may be transmitted to the controller 1180, and the controller 1180 may store values received from the measurement unit 1140 in a predetermined recording region of a predetermined memory (not shown).

When the FOD status packet is received from the modulator 1162 in the negotiation phase, the controller 1180 may determine a threshold value (or a threshold range) for determining whether a foreign object is present based on information comprised in the FOD status packet. Here, the determined threshold value may comprise a quality factor threshold value, without being limited thereto, and any threshold value predefined for foreign object detection may be used.

If a value which is set to determine whether a foreign object is present is a threshold range, the threshold range may be a quality factor threshold range.

In addition, the controller 1180 may determine whether a foreign object is present based on the path loss of transmit power. Here, the path loss of the transmit power may be obtained by subtracting the strength of the power actually received by the wireless power reception apparatus from the strength of the power transmitted through the resonant circuit 1130. The controller 1180 may confirm the strength of the power currently received by the wireless power reception apparatus based on information fed back from the wireless power reception apparatus. The controller 1180 may compare the calculated path loss with a predetermined path loss threshold value (or threshold range) to determine whether a foreign object is present.

In particular, the path loss threshold value (or threshold range) may be differently set according to the charging mode. For example, the path loss threshold value (or threshold range) corresponding to the fast charging mode may be greater than the path loss threshold value (or threshold range) corresponding to the baseline charging mode.

The controller 1180 may receive a signal strength packet comprising information on the receive powerstrength in the power transfer phase 440 or 510.

The controller 1180 may compare the receive power strength threshold value (or threshold range) predefined or determined in correspondence with the current transmit power strength with a receive power strength acquired (or calculated) based on feedback information received from the wireless power reception apparatus to determine whether information on the receive power strength received from the wireless power receiver has a normal value. Here, the receive power strength threshold value (or threshold range) may be determined based on the charging mode. For example, the power range transmittable in the fast charging mode may be between 10 watts and 20 watts. At this time, assume that the receive power strength threshold value corresponding to the fast charging mode is 6 W.

When the receive power strength confirmed based on the signal strength packet is 6 W or more, the controller 1180 may determine that information on the receive power strength comprised in the signal strength packet is normal.

However, when the receive power strength confirmed based on the signal strength packet is less than 6 W, the controller 1180 determine that information on the receive power strength comprised in the signal strength packet is abnormal.

In another example, the controller 1180 may compare a ratio of the receive power strength of the current transmit power strength with a predetermined threshold ratio to determine whether the information on the receive power strength is normal. Here, the threshold ratio may be determined based on a maximum path loss ratio pre-measured in correspondence with the transmitter.

Upon determining that the information on the receive power strength is not normal, the controller 1180 may apply a predetermined offset to the receive power strength to perform correction. For example, upon determining that the information is not normal in the fast charging mode, the controller 1180 may correct the receive power strength by adding a predetermined offset to the receive power strength.

The controller 1180 may calculate path loss based on the current transmit power strength and the corrected receive power strength. Subsequently, the controller 1180 may compare the calculated path loss with a predetermined path loss threshold value to determine whether a foreign object is placed on a wireless power transmission path.

In another example, the receive power strength threshold value may be determined based on a power range transmittable in the charging mode and a predetermined maximum path loss ratio (or a maximum path loss value). If the power range transmittable in the current charging mode is 10 to 18 watts and the predetermined maximum path loss ratio is 50%, the receive power strength of the receiver has a range of 5 to 9 watts. However, if the receive power strength acquired based on the actual signal strength packet is less than 5 watts, the controller 1180 may determine that the information on the receive power strength comprised in the signal strength packet is not normal. In this case, the controller 1180 may apply a predetermined offset corresponding to the current charging mode to correct the receive power strength.

Of course, if the information on the receive power strength is normal, the controller 1180 may calculate wireless power path loss based on the current transmit power strength and the receive power strength, without performing a separate correction procedure.

The controller 1180 according to an embodiment may selectively perform at least one of a foreign object detection procedure based on a quality factor value or a foreign object detection procedure based on path loss, according to user setting.

The controller 1180 according to another embodiment may compare the quality factor threshold value determined based on the FOD status packet received in the negotiation phase with the measured quality factor value to determine whether a foreign object is present and may calculate path loss based on the current transmit power strength and the receive signal strength packet in the power transfer phase, and determine whether a foreign object is present based on the calculated path loss.

For example, upon determining that the foreign object is present in the two results of determination, the controller 1180 may finally determine that the foreign object is present.

In another example, upon determining that the foreign object is present in any one of the two results of determination, the controller 1180 may finally determine that the foreign object is present.

The controller 1180 according to another embodiment may dynamically perform a foreign object detection procedure based on path loss according to the type of the wireless power receiver identified in the identification and configuration phase 420 and 520. Here, the type of the identified wireless power receiver may be determined based on software/firmware/protocol version information, manufacturer information, model information, receiver class or category, etc. For example, if it is confirmed that the identified wireless power receiver is a specific manufacturer and/or a specific model, the controller 1180 may perform the foreign object detection procedure based on path loss and control the other wireless power receiver to perform the foreign object detection procedure based on the quality factor value.

Figure 12:
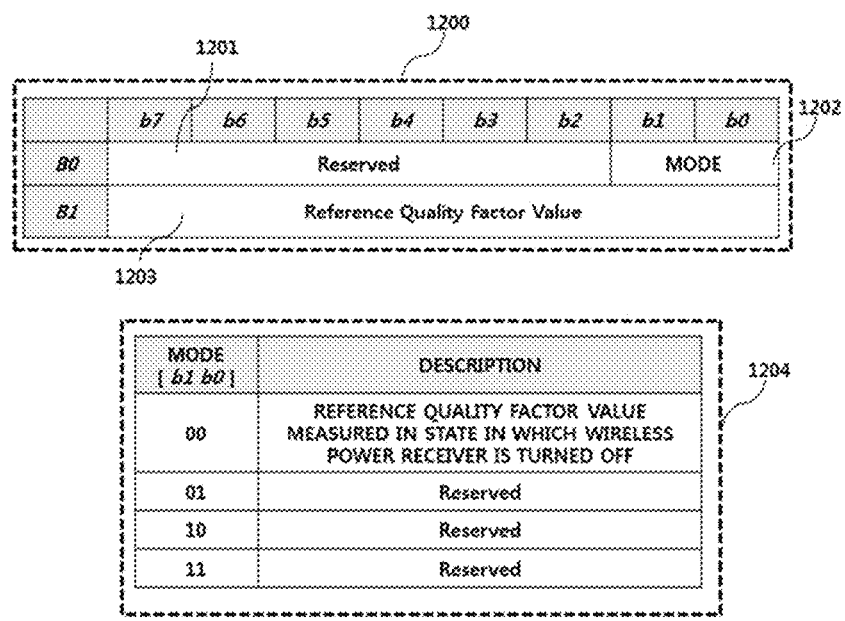
FIG. 12 is a view illustrating the structure of an foreign object detection status packet message.

FIG. 12 is a view illustrating the structure of a foreign object detection status packet message.

Referring to FIG. 12, the foreign object detection status packet message may have a length of 2 bytes and comprise a reserved 1201 field having a length of 6 bits, a mode 1202 field having a length of 2 bits and a reference quality factor value 1203 field having a length of 1 byte. Here, all bits of the reserved 1201 field are recorded with 0.

As denoted by reference numeral 1204, if the mode 1202 field is set to a binary number "00", this may mean that a reference quality factor value measured and determined in a state in which the wireless power receiver is powered off is recorded in the reference quality factor value 1203 field.

The reference quality factor value may be set to the smallest value of a first quality factor value measured at the center where a transmission coil (primary coil) and a reception coil (secondary coil) are well aligned in a state in which an FO is not present near the wireless power receiver placed in the charging area and second quality factor values measured while moving with a predetermined distance offset (e.g., +/−5 mm in an x-axis and a y-axis) from the center without rotation of the wireless power receiver. Here, the second quality factor values may comprise quality factor values measured at at least four positions.

Figure 13:
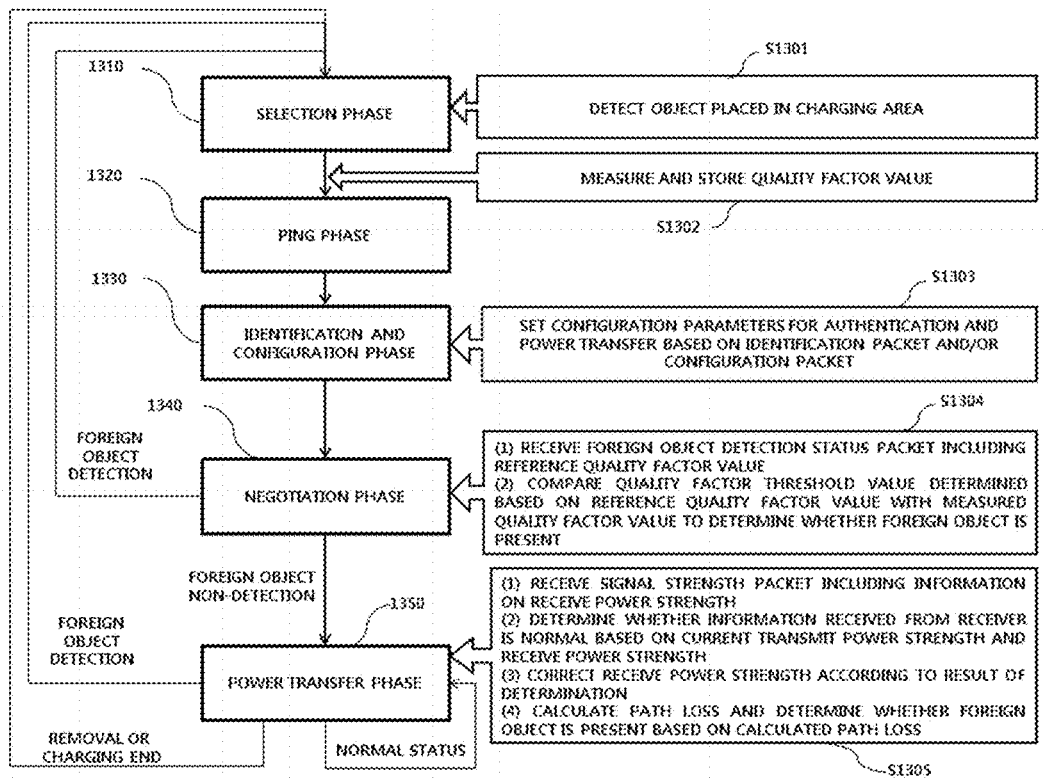
FIG. 13 is a state transition diagram illustrating a foreign object detection method in a wireless power transmission apparatus according to an embodiment.

FIG. 13 is a status transition diagram illustrating a foreign object detection method in a foreign object detection apparatus according to an embodiment.

Referring to FIG. 13, when an object placed in the charging area is detected (S1301), the foreign object detection apparatus may measure and store the quality factor value of the resonant circuit in a state of temporarily stopping wireless power transmission and then enter the ping phase 1320 (S1302).

In the ping phase 1320, the foreign object detection apparatus may periodically transmit a predetermined power signal for identifying a wireless power receiver, e.g., a digital ping signal.

When a response signal, e.g., a signal strength signal (or a signal strength packet) is received in the ping phase 1320, the foreign object detection apparatus may enter the identification and configuration phase 1330 to receive an identification packet and a configuration packet. The foreign object detection apparatus may authenticate the receiver based on the received identification packet and set a predetermined configuration parameter for power transmission to the receiver (S1303).

When the identification and configuration of the wireless power receiver is normally completed, the foreign object detection apparatus may enter the negotiation phase 1340 to receive a foreign object detection status packet comprising a reference quality factor value. The foreign object detection apparatus may determine a quality factor threshold value for determining whether a foreign object is present based on information comprised in the foreign object detection status packet and compare the determined quality factor threshold value with a quality factor value, which is previously measured and stored, to determine whether a foreign object is present (S1304).

Upon determining that the foreign object is present, the foreign object detection apparatus may stop power transmission and return to the selection phase 1310. In contrast, upon determining that the foreign object is not present, the foreign object detection apparatus may enter the power transfer phase 1350 to start wireless charging to the identified wireless power receiver.

The foreign object detection apparatus may perform a foreign object detection procedure based on path loss in the power transfer phase 1350.

The foreign object detection apparatus may perform power control based on a predetermined first feedback signal, e.g., a control error packet, in the power transfer phase 1350.

Hereinafter, the foreign object detection procedure based on path loss denoted by reference numeral 1305 will be described in detail.

During power control, the foreign object detection apparatus may identify (or calculate) the current receive power strength in the wireless power receiver based on a predetermined second feedback signal, e.g., a signal strength packet, comprising information on the receive power strength. At this time, the foreign object detection apparatus may determine whether information received from the receiver is normal based on the current transmit power strength and the receive power strength.

For example, the foreign object detection apparatus may compare the receive power strength threshold value determined in correspondence with the current transmit power strength (or the current charging mode) with the current receive power strength to determine whether information received from the wireless power receiver is normal.

Upon determining that the received information is not normal, the foreign object detection apparatus may correct the receive power strength by applying a predetermined offset to the receive power strength. Of course, when the received information is normal, the foreign object detection apparatus does not perform a separate correction procedure.

The foreign object detection apparatus may calculate path loss based on the current transmit power strength and the current (or corrected) receive power strength and compare the calculated path loss with a predetermined path loss threshold value (or threshold range) to determine whether a foreign object is present. Here, the path loss threshold value may be differently determined according to the charging mode. In another example, the path loss threshold value may be determined in proportion to the current transmit power strength.

Upon determining that the foreign object is detected in step 1305, the foreign object detection apparatus may return to the selection phase 1310. In addition, when the wireless power receiver is abnormally removed from the charging area or charging is completed, the foreign object detection apparatus may return to the selection phase 1310.

Of course, when the foreign object is not detected in step 1305, the foreign object detection apparatus may maintain the power transfer phase 1350.

Figure 14:
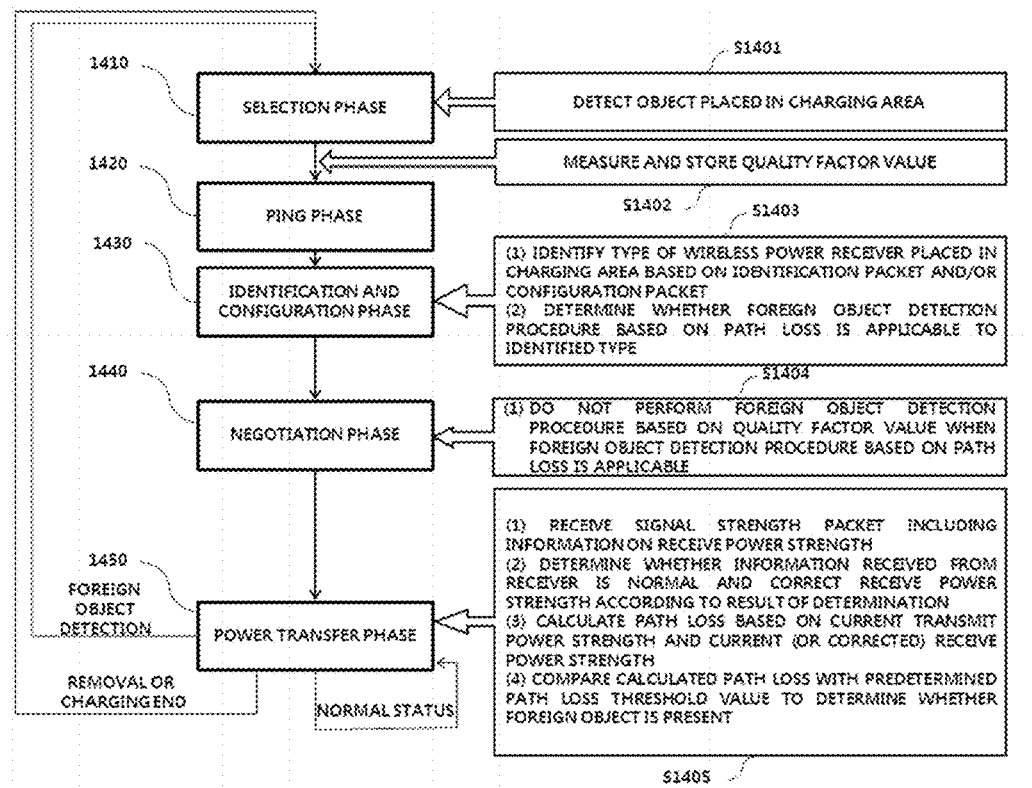
FIG. 14 is a state transition diagram illustrating a foreign object detection method in a wireless power transmission apparatus according to another embodiment.

FIG. 14 is a state transition diagram illustrating a foreign object detection method in a wireless power transmission apparatus according to another embodiment.

Referring to FIG. 14, when an object placed in the charging area is detected (S1401), the foreign object detection apparatus may measure the quality factor value of the resonant circuit in a state of temporarily stopping wireless power transmission, store the quality factor value in a predetermined recording region and then enter the ping phase 1420 (S1402).

In the ping phase 1420, the foreign object detection apparatus may periodically transmit a predetermined power signal for identifying a wireless power receiver, e.g., a digital ping signal.

When a response signal, e.g., a signal strength signal (or a signal strength packet), is received in the ping phase 1420, the foreign object detection apparatus may enter the identification and configuration phase 1430 to receive an identification packet and a configuration packet.

The foreign object detection apparatus may identify the type of the receiver placed in the charging area based on the received identification packet. At this time, the foreign object detection apparatus may determine whether the foreign object detection procedure based on path loss is applicable to the identified receiver type (S1403).

In the present embodiment, assume that the foreign object detection procedure based on path loss is applicable to the identified receiver type. Of course, if the foreign object detection procedure based on path loss is not applicable to the identified receiver type, the foreign object detection apparatus may perform the foreign object detection procedure based on the quality factor value (or another foreign object detection procedure) in the negotiation phase.

When the identification and configuration of the wireless power receiver is normally completed, the foreign object detection apparatus may enter the negotiation phase 1440. At this time, when the foreign object detection procedure based on path loss is applicable to the identified receiver type, the foreign object detection apparatus may not perform the foreign object detection procedure based on the quality factor value and may enter the power transfer phase 1450 when the negotiation procedure is normally completed (S1404).

Hereinafter, step 1405 shown in FIG. 14 will be described in detail.

The foreign object detection apparatus may dynamically control the transmit power strength based on the control error packet received in the power transfer phase 1450.

During power control, the foreign object detection apparatus may periodically receive the signal strength packet comprising the information on the receive power strength from the receiver.

The foreign object detection apparatus may determine whether the information on the receive power strength received from the receiver is normal.

For example, the foreign object detection apparatus may determine whether the information on the receive power strength is normal based on a ratio of the receive power strength to the current transmit power strength.

In another example, the foreign object detection apparatus may compare a receive power strength threshold value determined according to the currently set charging mode with the receive power strength to determine whether the received information is normal.

In another example, the foreign object detection apparatus may determine whether the receive power strength is comprised in a predefined receive power strength threshold range according to the currently set charging mode to determine whether the received information is normal.

In another example, the foreign object detection apparatus may determine the receive power strength threshold value in correspondence with the current transmit power strength. Here, the receive power strength threshold value may be set to a minimum receive power strength receivable by the wireless power receiver in correspondence with the current transmit power strength. In this case, when the receive power strength confirmed (or calculated) based on the signal strength packet is less than the determined receive power strength threshold value, the foreign object detection apparatus may determine that the information on the receive power strength received from the receiver is not normal.

When the information on the receive power strength received from the receiver is not normal, the foreign object detection apparatus may apply a predetermined offset to the receive power strength to perform correction. Here, the offset may be dynamically determined in proportion to the current transmit power strength or the power class (or the charging mode) or receiver category requested by the receiver. Here, the power class may be divided into Low Power Class, Mid Power Class, etc. without being limited thereto. The power class may be differently defined according to the applied standard and the design of those skilled in the art. In another example, the offset may be a fixed value.

For example, the corrected receive power strength ARP may be calculated by adding the offset to the acquired (or calculated) receive power strength RP, without being limited thereto.

The foreign object detection apparatus may calculate the path loss based on the current transmit power strength and the corrected receive power strength and compare the calculated path loss with a predetermined path loss threshold value to determine whether a foreign object is present on the wireless power transmission path.

For example, the path loss threshold value may be a predefined fixed value.

In another example, the path loss threshold value may be dynamically determined according to the types of the transmitter and the receiver.

In another example, the path loss threshold value may be dynamically determined according to the current transmit power strength.

In another example, the path loss threshold value may be determined in correspondence with the currently set charging mode.

When the calculated path loss exceeds a predetermined path loss threshold value, the foreign object detection apparatus may determine that the foreign object is present on the wireless transmission path.

Upon determining that the foreign object is detected in step 1405, the foreign object detection apparatus may return to the selection phase 1310. In addition, when the wireless power receiver is abnormally removed from the charging area or charging is completed, the foreign object detection apparatus may return to the selection phase 1410.

Of course, when the foreign object is not detected in step 1405, the foreign object detection apparatus may maintain the power transfer phase 1450.

Figure 15:
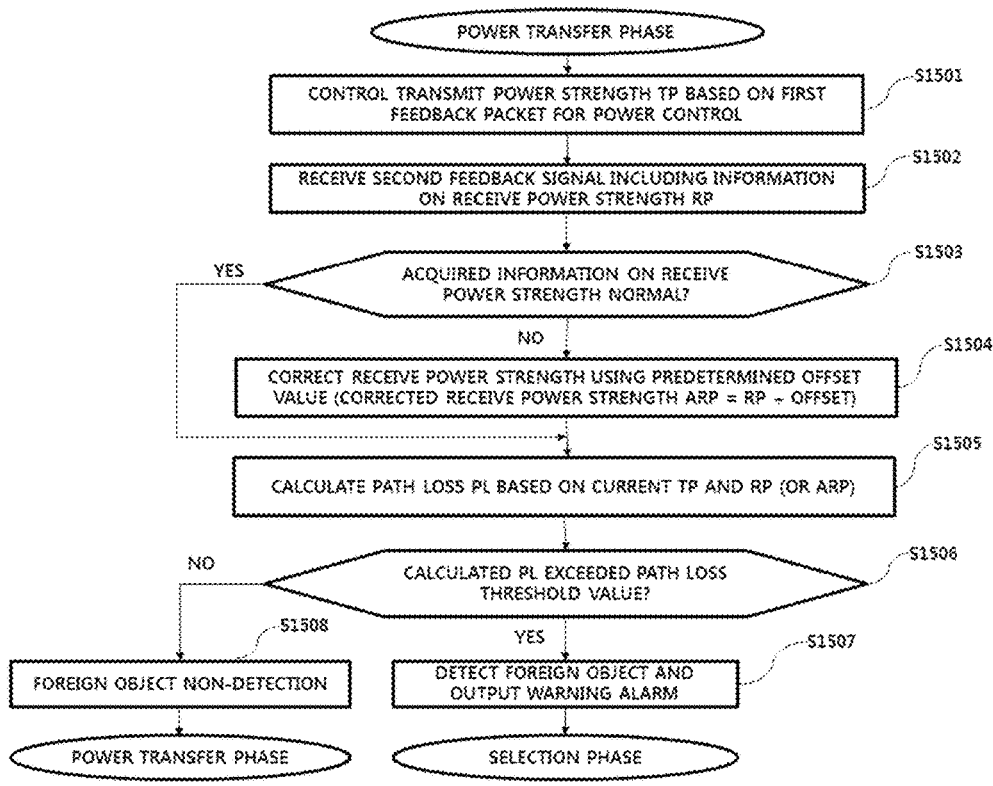
FIG. 15 is a flowchart illustrating a foreign object detection method according to an embodiment.

FIG. 15 is a flowchart illustrating a foreign object detection method according to an embodiment.

Referring to FIG. 15, the wireless power transmitter may control the transmit power strength TP based on a first feedback packet when entering the power transfer phase (S1501). At this time, the wireless power transmitter may measure the strength of power transmitted through a resonant circuit using the measurement unit provided therein. Here, the first feedback packet may be a control error packet defined in the Qi standard, but this is merely an embodiment. It should be noted that the feedback signal for power control may vary according to the wireless power transmission standard applied to the wireless power transmitter.

The wireless power transmitter may receive a second feedback packet comprising information on a receive power strength from a wireless power receiver in the power transfer phase (S1502). At this time, the wireless power transmitter may calculate the receive power strength RP based on the strength information of receive power. Here, the second feedback packet may be a signal strength packet defined in the Qi standard, but is merely an embodiment. It should be noted that the feedback signal for acquiring the information on the receive power strength may vary according to the wireless power transmission standard applied to the wireless power transmitter.

The wireless power transmitter may determine whether information on the receive power strength comprised in the second feedback packet is a normal value (S1503). For the method of determining whether the information on the receive power strength is normal, refer to the description of the above drawings.

Upon determining that the information on the receive power strength is not normal, the wireless power transmitter may correct the receive power strength using a predetermined offset (S1504).

The wireless power transmitter may calculate path loss PL based on a current transmit power strength and the receive power strength (or the corrected receive power strength) (S1505).

The wireless power transmitter may determine whether the calculated path loss value exceeds the path loss threshold value (S1506).

Upon determining that the calculated path loss value exceeds the path loss threshold value, the wireless power transmitter may determine that a foreign object is placed on the wireless power transmission path (S1507). At this time, the wireless power transmitter may output a predetermined warning alarm through an alarm unit provided therein and then enter the selection phase.

Upon determining that the calculated path loss value is less than the path loss threshold value in step 1506, the wireless power transmitter may determine that a foreign object is not present on the wireless power transmission path (S1508). The wireless power receiver may determine that power having a less strength than actually received power is received due to errors or an internal circuit element, errors of installed software or errors of sensors. If the receive power strength is not corrected, path loss may have a very large value and thus the wireless power transmitter may determine that a foreign object is present even though a foreign object is not present on the wireless power transmission path.

As described above, in the present embodiments, it is possible to prevent power transmission from being stopped, by determining whether the information on the receive power strength is normal and adaptively correcting the receive power strength according to the result of determination.

In addition, in the present embodiment, it is possible to more accurately detect a foreign object, by correcting the receive power strength when a receiver in which the receive power strength is abnormal as compared to the transmit power strength in the fixed frequency type wireless power transmitter.

Figure 16:
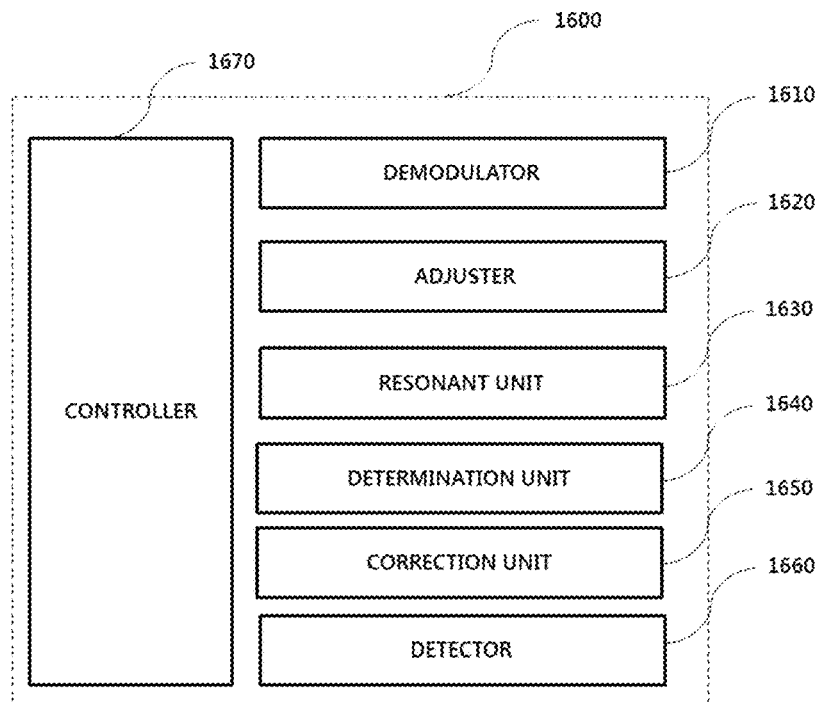
FIG. 16 is a block diagram showing the configuration of a foreign object detection apparatus according to an embodiment.

FIG. 16 is a block diagram showing the configuration of a foreign object detection apparatus according to an embodiment.

The foreign object detection apparatus 1600 according to the present embodiment may be configured in the form of a measurement apparatus for authentication of a wireless power transmission apparatus or a wireless power reception apparatus.

Referring to FIG. 16, the foreign object detection apparatus 1600 may comprise a demodulator 1610, an adjuster 1620, a resonant unit 1630, a determination unit 1640, a correction unit 1650, a detector 1660 and a controller 1670. Hereinafter, some components of the foreign object detection apparatus 1600 may be integrated in at least one microprocessor, and the other components may be configured in the form of circuit elements, sensors, integrated circuits, etc. For example, the resonant unit 1630 may be the resonant circuit 1130 of FIG. 11 and the adjuster 1620 may comprise at least one of a DC-to-DC converter 1110 or an inverter 1120. In addition, the demodulator 1610 may comprise at least one of a frequency filter, an amplifier or an integrator for wireless signal processing and may be implemented in the form of an ASIC and/or a digital signal processor (DSP), without being limited thereto.

The controller 1670 may control overall operation and input/output of the foreign object detection apparatus 1600.

When a wireless signal transmitted by the wireless power receiver is received through an antenna (or a transmission coil) provided therein, the demodulator 1610 may demodulate the wireless signal and transmit the demodulated packet to the controller 1670. For example, the demodulator 1610 may demodulate a feedback packet received for power control during power transmission, that is, a control error packet, and a predetermined packet for feeding back the strength information of the wireless power signal received by the wireless power receiver, for example, a signal strength packet, and transmit the demodulated packet to the controller 1670.

The adjuster 1620 may dynamically adjust the strength of power transmitted through the resonant unit 1630 based on the feedback packet for requesting power control.

The resonant unit 1630 may comprise a resonant circuit for wirelessly transmitting an AC power signal having a specific frequency.

The determination unit 1640 may determine whether information received from the wireless power receiver, for example, information on the receive power strength, is normal.

For example, the determination unit 1640 may compare a receive power strength threshold value determined in correspondence with a current charging mode with the receive power strength to determine whether the received information is normal. Specifically, the determination unit 1640 may determine that the information on the receive power strength acquired from the receiver is not normal, when the receive power strength is less than the receive power strength threshold value.

In another example, the determination unit 1640 may determine whether the received information is normal based on a ratio of the receive power strength to the current transmit power strength. Specifically, the determination unit 1640 may determine that the information on the receive power strength acquired from the receiver is not normal when a value obtained by dividing the receive power strength value by the current transmit power strength is less than a predetermined ratio threshold value.

The correction unit 1650 may correct the receive power strength using a predetermined offset when the determination unit 1640 determines that the received information is not normal. For example, the correction unit 1650 may add the offset to the receive power strength value to calculate a corrected receive power strength value when the acquired information on the receive power strength is not normal. Here, the offset may be dynamically determined based on at least one of a charging mode, a current transmit power strength, the type of a transmitter installed in the foreign object detection apparatus, or the type of the receiver, but this is merely one embodiment. A specific fixed value may be used as an offset.

The detector 1660 may calculate path loss based on the current transmit power strength and the receive power strength (or the corrected receive power strength). For example, the path loss may be calculated as a difference between the current transmit power strength and the receive power strength.

The detector 1660 may compare the calculated path loss with the path loss threshold value (or the threshold range) to determine whether a foreign object is present. For example, when the calculated path loss is greater than the path loss threshold value, it is determined that a foreign object is placed on the wireless power transmission path.

In addition, the detector 1660 may determine a quality factor threshold value based on the foreign object detection status packet received in the negotiation phase and compare the quality factor threshold value with a quality factor value measured before entering the ping phase after object detection to determine whether a foreign object is present.

Although the detector 1660 performs the foreign object detection procedure based on path loss and the foreign object detection procedure based on the quality factor value in the above-described embodiment, this is merely an embodiment and various foreign object detection procedures defined by those skilled in the art may be additionally performed.

The operations and functions of the components of the foreign object detection apparatus 1600 may further comprise the components and functions disclosed in the description of the above drawings.

Although the wireless power transmitter (or the foreign object detection apparatus) corrects the receive power strength and determine whether a foreign object is present when the information on the receive power strength comprised in the feedback packet is not normal in the above-described embodiments, this is merely an embodiment. A wireless power transmitter (or a foreign object detection apparatus) according to another embodiment may end the foreign object detection procedure based on path loss and perform a foreign object detection procedure based on a quality factor value, when the information on the receive power strength is not normal.

For example, upon determining that the information on the receive power strength is not normal during the foreign object detection procedure based on path loss in the power transfer phase, the wireless power transmitter (or the foreign object detection apparatus) may temporarily stop power transmission and enter the negotiation phase to perform the foreign object detection procedure based on the quality factor value.

Figure 17:
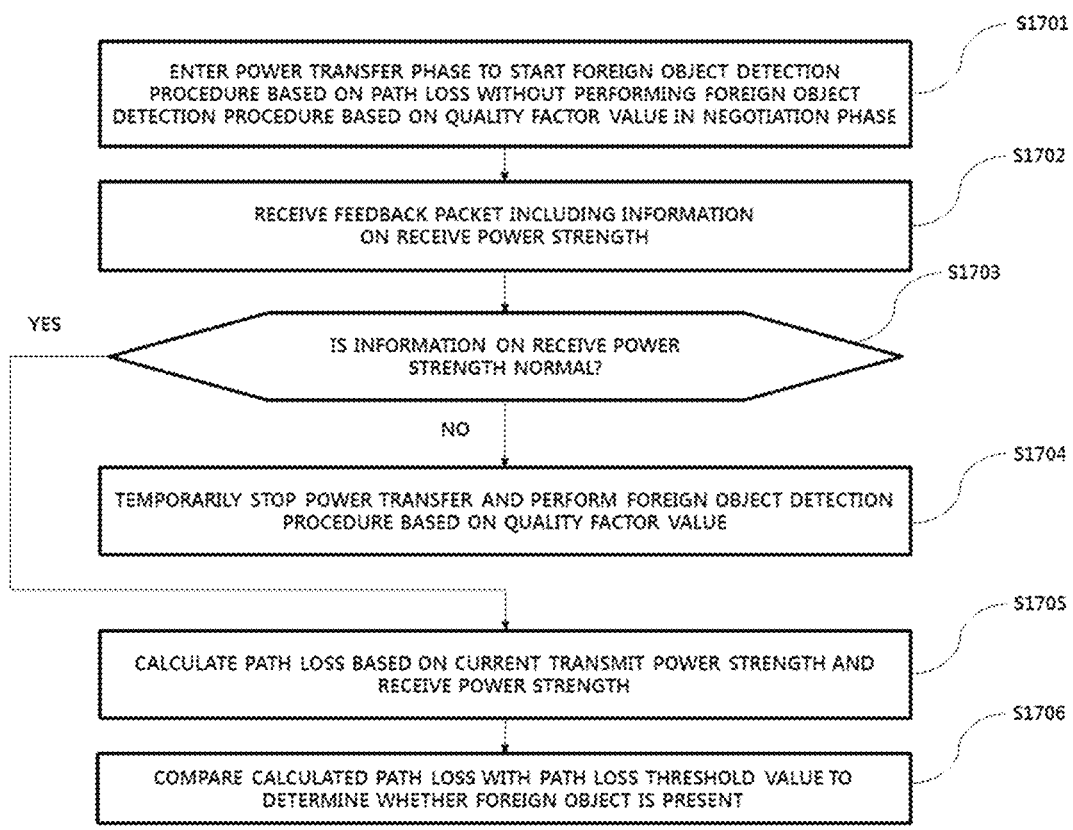
FIG. 17 is a flowchart illustrating a foreign object detection method according to an embodiment.

FIG. 17 is a flowchart illustrating a foreign object detection method according to an embodiment.

Referring to FIG. 17, the foreign object detection apparatus may not perform the foreign object detection procedure based on the quality factor value in the negotiation phase and may enter the power transfer phase to start the foreign object detection procedure based on path loss (S1701).

The foreign object detection apparatus may periodically receive a feedback packet comprising the information on the receive power strength during charging (S1702).

The foreign object detection apparatus may determine whether the information on the receive power strength is normal (S1703).

Upon determining that the information is normal, the foreign object detection apparatus may calculate path loss based on the current transmit power strength and the receive power strength and compare the calculated path loss with a predetermined path loss threshold value to determine whether a foreign object is present (S1705 to S1706).

Upon determining that the information is not normal in step 1703, the foreign object detection apparatus may temporarily stop power transmission and perform the foreign object detection procedure based on the quality factor value.

For example, the method of switching the foreign object detection procedure depending on whether the information on the receive power strength is normal, which is described in the embodiment of FIG. 17, is applicable to the case where the charging mode set according to the wireless power receiver is a fast charging mode, without being limited thereto, and is applicable regardless of the charging mode.

Accordingly, in the present embodiment, it is possible to more accurately detect a foreign object, by adaptively switching the foreign object detection procedure depending on whether the information on the receive power strength is normal.

Although switching to the foreign object detection procedure based on the quality factor value is described as being performed upon determining that the information on the receive power strength is not normal during the foreign object detection procedure based on path loss in the power transfer phase in the above-described embodiments, this is merely one embodiment and switching to another foreign object detection procedure separately defined according to the design of those skilled in the art or another foreign object detection procedure defined in the wireless power transmission standard is possible.

The method according to the foregoing embodiments may be implemented as code that can be written to a computer-readable recording medium and can thus be read by a computer. Examples of the computer-readable recording medium comprise a ROM, a RAM, a CD-ROM, a magnetic tape, a floppy disk, an optical data storage, and a carrier wave (e.g., data transmission over the Internet).

The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

Those skilled in the art will appreciate that the disclosure may be carried out in other specific ways than those set forth herein without departing from the spirit and essential characteristics of the disclosure.

The above exemplary embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The embodiments relate to wireless power transmission technology and are applicable to a wireless power transmitter for wirelessly transmitting power to a wireless power receiver using a resonant circuit provided therein.

The invention claimed is:

1. A wireless power transmission method of a wireless power transmitter, the wireless power transmission method comprising:
performing a foreign object detection procedure based on a quality factor value before power transmission; and
performing a foreign object detection procedure based on path loss during the power transmission,
wherein the foreign object detection procedure based on the quality factor value comprises:
storing a measured quality factor value of a resonant circuit;
receiving a foreign object detection status packet comprising a reference quality factor value;
determining a quality factor threshold value based on the reference quality factor value; and
comparing the measured quality factor value with the quality factor threshold value to determine whether the foreign object is present,
wherein the foreign object detection procedure based on the path loss comprises:
calculating the path loss based on a transmit power strength and a receive power strength; and
comparing the calculated path loss with a path loss threshold value to determine whether the foreign object is present,
wherein the path loss threshold value is dynamically determined, and
wherein, if determining that the foreign object is not present through the foreign object detection procedure based on the quality factor value, the foreign object detection procedure based on the path loss is performed.

2. The wireless power transmission method according to claim 1, if determining that the foreign object is present through the foreign object detection procedure based on the quality factor value, the power transmission is stopped.

3. The wireless power transmission method according to claim 1, if determining that the foreign object is not present through the foreign object detection procedure based on the path loss, the power transmission is maintained.

4. The wireless power transmission method according to claim 3, if determining that the foreign object is present through the foreign object detection procedure based on the path loss, the power transmission is stopped.

5. The wireless power transmission method according to claim 1, wherein the path loss threshold value is determined based on the transmit power strength.

6. The wireless power transmission method according to claim 1, wherein the foreign object detection procedure based on the path loss comprises correcting the receive power strength.

7. The wireless power transmission method according to claim 1, wherein the foreign object detection procedure based on the path loss comprises determining whether the receive power strength is normal.

8. The wireless power transmission method according to claim 7, wherein whether the receive power strength is normal is determined based on the transmit power strength and predefined transmission efficiency.

9. A wireless power transmitter comprising:
a resonant unit configured to wirelessly transmit power using a resonant circuit; and
a controller configured to perform a foreign object detection procedure based on a quality factor value before power transmission and to perform a foreign object detection procedure based on path loss during the power transmission,
wherein the controller:
performs the foreign object detection procedure based on the quality factor value, by determining a quality factor threshold value based on a reference quality factor value when a foreign object detection status packet comprising the reference quality factor value is received and comparing a measured quality factor value of the resonant circuit with the quality factor threshold value, and
performs the foreign object detection procedure based on the path loss, by calculating the path loss based on transmit power strength and receive power strength and comparing the calculated path loss with a path loss threshold value,
wherein the path loss threshold value is dynamically determined, and
wherein the controller performs the foreign object detection procedure based on the path loss, upon determining that the foreign object is not present through the foreign object detection procedure based on the quality factor value.

10. The wireless power transmitter according to claim 9, wherein the controller stops the power transmission, upon determining that a foreign object is present through the foreign object detection procedure based on the quality factor value.

11. The wireless power transmitter according to claim 9, wherein the controller maintains the power transmission, upon determining that a foreign object is not present through the foreign object detection procedure based on the path loss.

12. The wireless power transmitter according to claim 11, wherein the controller stops the power transmission, upon determining that a foreign object is present through the foreign object detection procedure based on the path loss.

13. The wireless power transmitter according to claim 9, wherein the path loss threshold value is determined based on the transmit power strength.

14. The wireless power transmitter according to claim 9, wherein the controller determines whether the receive power strength is normal during the foreign object detection procedure based on the path loss.

15. The wireless power transmitter according to claim 14, wherein the controller corrects the receive power strength when the receive power strength is not normal.

16. The wireless power transmitter according to claim 14, wherein the controller determines whether the receive power strength is normal based on the transmit power strength and predefined transmission efficiency.

17. A wireless power transmission method of a wireless power transmitter, the wireless power transmission method comprising:
  performing a foreign object detection procedure based on a quality factor value before power transmission; and
  performing a foreign object detection procedure based on path loss during the power transmission,
wherein the foreign object detection procedure based on the quality factor value comprises:
storing a measured quality factor value of a resonant circuit;
receiving a foreign object detection status packet comprising a reference quality factor value;
determining a quality factor threshold value based on the reference quality factor value; and
comparing the measured quality factor value with the quality factor threshold value to determine whether a foreign object is present,
wherein the foreign object detection procedure based on the path loss comprises:
calculating the path loss based on a transmit power strength and a receive power strength; and
comparing the calculated path loss with a path loss threshold value to determine whether the foreign object is present,
wherein the path loss threshold value is dynamically determined, and
wherein the foreign object detection procedure based on the path loss comprises determining whether the receive power strength is normal.

* * * * *